(12) United States Patent
Himura et al.

(10) Patent No.: US 9,493,011 B2
(45) Date of Patent: Nov. 15, 2016

(54) FILLING LIQUID FOR DISTRIBUTION OF INK JET HEAD, INK JET HEAD, AND DISTRIBUTION METHOD FOR INK JET HEAD

(71) Applicant: CANON FINETECH INC., Misato-shi, Saitama-ken (JP)

(72) Inventors: Eriko Himura, Saitama (JP); Shintaro Suzuki, Yashio (JP); Yusuke Sumikawa, Kashiwa (JP); Takahiro Tsutsui, Matsudo (JP); Shoji Koike, Yokohama (JP)

(73) Assignee: Canon Finetech Inc., Misato-shi (JP)

( * ) Notice: Subject to any disclaimer, the term of this patent is extended or adjusted under 35 U.S.C. 154(b) by 0 days.

(21) Appl. No.: 14/200,191

(22) Filed: Mar. 7, 2014

(65) Prior Publication Data
US 2014/0313265 A1   Oct. 23, 2014

(30) Foreign Application Priority Data

Apr. 18, 2013 (JP) .................. 2013-087271
Apr. 18, 2013 (JP) .................. 2013-087272

(51) Int. Cl.
   *C09D 11/328* (2014.01)
   *B41J 2/175* (2006.01)

(52) U.S. Cl.
   CPC ............ *B41J 2/17563* (2013.01); *B41J 2/175* (2013.01); *B41J 2/17509* (2013.01); *B41J 2/17533* (2013.01); *C09D 11/328* (2013.01)

(58) Field of Classification Search
   CPC    B41J 2/17533; B41J 2/17563; B41M 5/529; B41M 5/5218; C09D 11/02; C09D 11/30; C09D 11/322
   USPC .................. 347/45, 46, 47, 95, 96, 100
   See application file for complete search history.

(56) References Cited

U.S. PATENT DOCUMENTS

| 4,838,938 A | 6/1989 | Tomida et al. |
| 4,965,609 A | 10/1990 | Tomida et al. |

(Continued)

FOREIGN PATENT DOCUMENTS

| EP | 1 489 149 A1 | 12/2004 |
| JP | H03-248849 A | 11/1991 |

(Continued)

OTHER PUBLICATIONS

European Search Report dated Aug. 5, 2014, in European Appln. No. 14160418.1.

(Continued)

*Primary Examiner* — Anh T. N. Vo
(74) *Attorney, Agent, or Firm* — Fitzpatrick, Cella, Harper & Scinto

(57) ABSTRACT

A filling liquid for distribution of an ink jet head of a thermal type, the filling liquid filling a nozzle flow path during distribution of the ink jet head, a hydrophilic region formed on a periphery of an ink discharge port having an opening area of from 100 to 350 $\mu m^2$, the filling liquid including: an aqueous medium having at least a water-soluble organic compound and water as constituents; and a dye dissolved in the aqueous medium, a concentration of the dye in the filling liquid being 0.2 mass % or more and 1 mass % or less with respect to a total mass of the filling liquid and the concentration of the dye being equal to or less than saturation solubility with respect to the water-soluble organic compound, wherein the filling liquid has a surface tension of 25 mN/m or more and 34 mN/m or less.

43 Claims, 9 Drawing Sheets

(56) References Cited

U.S. PATENT DOCUMENTS

| | | | |
|---|---|---|---|
| 4,973,499 | A | 11/1990 | Iwata et al. |
| 5,067,980 | A | 11/1991 | Koike et al. |
| 5,697,144 | A | 12/1997 | Mitani et al. |
| 5,980,021 | A | 11/1999 | Nagoshi et al. |
| 6,247,789 | B1 * | 6/2001 | Sanada ............... 347/45 |
| 7,198,362 | B2 | 4/2007 | Taguchi |
| 7,294,184 | B2 | 11/2007 | Fujimoto et al. |
| 7,306,664 | B2 | 12/2007 | Kato et al. |
| 7,449,056 | B2 | 11/2008 | Kato et al. |
| 7,513,602 | B2 * | 4/2009 | Nishijima ............... 347/47 |
| 7,530,668 | B2 | 5/2009 | Tomita et al. |
| 7,611,570 | B2 | 11/2009 | Koike et al. |
| 7,641,723 | B2 | 1/2010 | Koike et al. |
| 7,648,228 | B2 * | 1/2010 | Kojima ............... 347/68 |
| 7,878,643 | B2 * | 2/2011 | Kudo et al. ............... 347/100 |
| 8,262,199 | B2 * | 9/2012 | Takahashi ............... 347/45 |
| 8,328,341 | B2 | 12/2012 | Koike et al. |
| 8,328,926 | B2 | 12/2012 | Koike et al. |
| 8,408,691 | B2 | 4/2013 | Koike et al. |
| 8,469,504 | B2 * | 6/2013 | Saito et al. ............... 347/100 |
| 8,506,067 | B2 | 8/2013 | Koike et al. |
| 2006/0109324 | A1 | 5/2006 | Fujimoto et al. |
| 2006/0152550 | A1 | 7/2006 | Tomita et al. |
| 2008/0250642 | A1 | 10/2008 | Tomita et al. |
| 2012/0328854 | A1 | 12/2012 | Matsuyama et al. |
| 2013/0222462 | A1 | 8/2013 | Okubo et al. |

FOREIGN PATENT DOCUMENTS

| | | |
|---|---|---|
| JP | 5-169676 A | 7/1993 |
| JP | H8-207291 A | 8/1996 |
| JP | 11-334074 A | 12/1999 |
| JP | 2000-094707 A | 4/2000 |
| JP | 2000-168056 A | 6/2000 |
| JP | 2003-176432 A | 6/2003 |
| JP | 2004-174753 A | 6/2004 |
| JP | 2004-188673 A | 7/2004 |
| JP | 2005-279946 A | 10/2005 |
| JP | 2006-045537 A | 2/2006 |
| JP | 2006-192622 A | 7/2006 |
| JP | 2008-120040 A | 5/2008 |
| JP | 2010-076396 A | 4/2010 |
| JP | 2011-184518 A | 9/2011 |
| JP | 2013-014111 A | 1/2013 |

OTHER PUBLICATIONS

May 8, 2015 European Communication in European Patent Appln. No. 14160418.1.

* cited by examiner

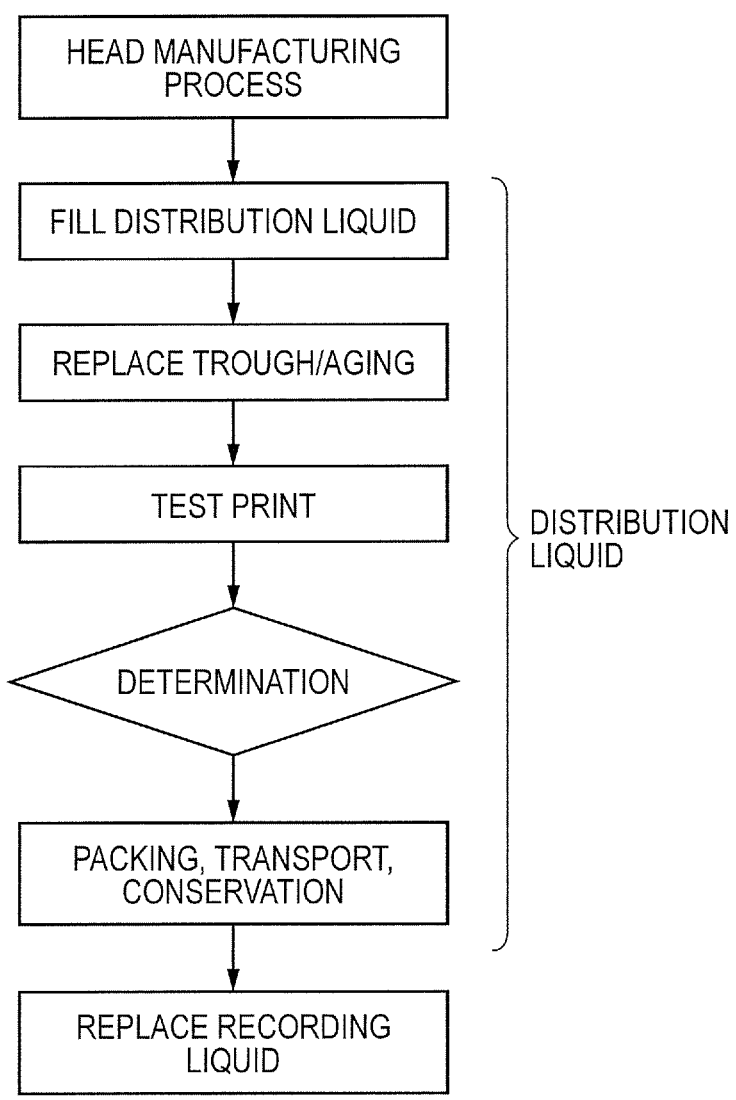

FILLING LIQUID FOR DISTRIBUTION OF INK JET HEAD, INK JET HEAD, AND DISTRIBUTION METHOD FOR INK JET HEAD

BACKGROUND OF THE INVENTION

1. Field of the Invention

The present invention relates to a filling liquid for distribution, which is to fill a nozzle flow path communicating with an ink discharge port during distribution of a thermal ink jet recording head (ink jet head), to an ink jet head using the filling liquid for distribution, and to a distribution method for the ink jet head.

2. Description of the Related Art

Hitherto, as a thermal ink jet head, there has been known an ink jet head having a structure in which a plurality of nozzle flow paths partitioned by nozzle walls are formed, a plurality of ink discharge ports communicating with the nozzle flow paths are formed, and a heater is disposed in each nozzle flow path. The ink jet head having the above-mentioned structure has a mechanism in which ink filling the inside of each nozzle flow path is heated by a heater to make the ink bubble (foam) to fly liquid droplets of ink from the ink discharge ports.

The ink jet head having the above-mentioned structure has a problem in that, when ink for printing is conserved while filling the nozzle flow paths for a long period of time, the ink is thickened or solidified owing to the volatilization of an ink solvent, and the discharge performance of the ink jet head is degraded even when the ink jet head is subjected to a recovery operation. In a piezoelectric system in which mechanical deformation of a piezoelectric element makes droplets of ink fly, even when ink is thickened or solidified, an ink jet head can be recovered by a recovery operation in most cases. On the other hand, in a thermal system in which heating of a heater makes droplets of ink fly, the above-mentioned problem becomes more serious. Conversely, when the ink jet head is conserved for a long period of time while the nozzle flow paths are kept empty, the surface of the heater is exposed to outside air to be contaminated, and the discharge performance of the ink jet head is degraded during printing, which may degrade printing quality.

Considering the above-mentioned problem, it has been proposed to fill the inside of a recording head with only ink for conservation instead of ink for printing during conservation or distribution before start of use (Japanese Patent Application Laid-Open No. H05-169676). Japanese Patent Application Laid-Open No. H05-169676 proposes that a liquid containing water and diethylene glycol as constituents, ink subjected to deaeration, or the like be used as the ink for conservation. It has been also proposed that a flow path of an ink jet head be filled with a conservation liquid containing a humectant, a nonionic surfactant, and a dye during shipment, transport, and conservation of a printer (Japanese Patent Application Laid-Open No. 2000-168056). Japanese Patent Application Laid-Open No. 2000-168056 proposes that a water-soluble organic solvent having a plurality of hydroxyl groups, in particular, one having a viscosity of less than 40 centipoises be used as the humectant.

Further, it has been known that, in the thermal ink jet head, the surface state of the periphery of an ink discharge port greatly influences ink dischargeability (discharge performance of the ink jet head) owing to the mechanism of allowing ink to fly with heat energy. Specifically, the thermal ink jet head has a problem in that discharged ink gets around an outer surface (also referred to as "face surface") of the ink discharge port depending on the surface state of the periphery of the ink discharge port, with the result that a liquid pool is formed on the periphery of the discharge port. The liquid pool is not preferred because it causes ink to fly in a direction displaced from a direction (normal direction) in which the ink is supposed to fly and leads to the occurrence of so-called "misdirection print" and the degradation in printing quality.

In view of the foregoing, it has been proposed to form a hydrophilic region in a peripheral area of a discharge port on the face surface in a recording head for aqueous pigment ink (Japanese Patent Application Laid-Open No. 11-334074). Japanese Patent Application Laid-Open No. 11-334074 proposes that a hydrophilic region be formed by, for example, surface roughening by laser irradiation or the like, or formation of a hydrophilic film made of a water-soluble resin such as hydroxypropyl cellulose, etc.

It has also been proposed to form a water-repellent region in a peripheral area of a discharge port on the face surface in a recording head for aqueous pigment ink (Japanese Patent Application Laid-Open No. H11-334074). Japanese Patent Application Laid-Open No. H11-334074 proposes that a water-repellent region be formed by, for example, coating with a water repellent agent.

The ink for conservation described in Japanese Patent Application Laid-Open No. H05-169676 and the conservation liquid described in Japanese Patent Application Laid-Open No. 2000-168056 exhibit certain effects of preventing the solidification of ink caused by long-term conservation and the contamination of a heater to keep the discharge performance of an ink jet head and printing quality, but have the following problems.

In recent years, in an ink jet printer, there has been a demand for miniaturizing pixels so as to perform printing with high precision and high resolution (for example, the amount of one droplet of ink is 10 pL or less), and the size of an ink discharge port of an ink jet head has been being reduced. Even when the ink for conservation described in Japanese Patent Application Laid-Open No. H05-169676 and the conservation liquid described in Japanese Patent Application Laid-Open No. 2000-168056 are applied to the ink jet head having an ink discharge port with a small aperture formed therein, the effect of preventing the thickening and solidification of ink caused by long-term conservation and the contamination of a heater so as to keep the discharge performance of an ink jet head and printing quality cannot be obtained sufficiently.

There is also a problem in that, when the ink for conservation described in Japanese Patent Application Laid-Open No. H05-169676 and the conservation liquid described in Japanese Patent Application Laid-Open No. 2000-168056 are applied to the recording head having a hydrophilic region formed therein as described in Japanese Patent Application Laid-Open No. H11-334074, the surface state of the hydrophilic region changes and the hydrophilicity thereof is degraded. This is not preferred because the discharge performance is not obtained as originally expected in spite of the fact that the hydrophilic region is formed on a discharge port formation surface, and "misdirection print" and degradation in printing quality occur.

There is also a problem in that, when the ink for conservation described in Japanese Patent Application Laid-Open No. H05-169676 and the conservation liquid described in Japanese Patent Application Laid-Open No. 2000-168056 are applied to the recording head having a water-repellent region formed therein as described in Japanese Patent Application Laid-Open No. H11-334074, the surface state of the water-repellent region changes and the water repellency thereof is degraded. This is not preferred because the discharge performance is not obtained as originally expected in spite of the fact that the water-repellent region is formed on a discharge port formation surface, and "misdirection print" and degradation in printing quality occur.

SUMMARY OF THE INVENTION

The present invention has been made so as to solve the above-mentioned problems in the related art. That is, the present invention provides: a filling liquid for distribution of an ink jet head capable of effectively preventing the degradation in discharge performance and printing quality, in particular, the occurrence of "misdirection print", involved in, for example, the thickening and solidification of ink caused by long-term conservation, the contamination of the surface of a heater, and the liquid pool of a discharge port peripheral portion; and an ink jet head and a distribution method for an ink jet head each using the filling liquid for distribution.

The inventors of the present invention have earnestly studied the above-mentioned problems and found that the problems can be solved by accurately controlling the composition and physical properties of a filling liquid for distribution, thereby achieving the present invention. That is, according to some embodiments of the present invention, there are provided a filling liquid for distribution of an ink jet head, an ink jet head, and a distribution method for an ink jet head described below.

According to one embodiment of the present invention, there is provided a filling liquid for distribution of an ink jet head, which is to fill a nozzle flow path communicating with an ink discharge port during distribution of a thermal ink jet head, the ink discharge port of the ink jet head having an opening area of from 100 to 350 $\mu m^2$, the ink jet head including a hydrophilic region formed on a periphery of the ink discharge port, the filling liquid for distribution including: an aqueous medium containing at least a water-soluble organic compound and water as constituents; and a dye dissolved in the aqueous medium, in which: the dye is contained in a concentration of 0.2 mass % or more and 1 mass % or less with respect to a total mass of the filling liquid for distribution and in a concentration equal to or less than saturation solubility with respect to the water-soluble organic compound; and the filling liquid for distribution has a surface tension of 25 mN/m or more and 34 mN/m or less.

According to another embodiment of the present invention, there is provided a thermal ink jet head, including: an ink discharge port having an opening area of from 100 to 350 $\mu m^2$; and a hydrophilic region formed on a periphery of the ink discharge port, in which a nozzle flow path communicating with the ink discharge port is filled with the above-mentioned filling liquid for distribution.

According to still another embodiment of the present invention, there is provided a distribution method for an ink jet head for distributing a thermal ink jet head, using, as the ink jet head, an ink jet head including an ink discharge port having an opening area of from 100 to 350 $\mu m^2$ and a hydrophilic region formed on a periphery of the ink discharge port, the distribution method including distributing the ink jet head while the filling liquid for distribution fills a nozzle flow path communicating with the ink discharge port.

According to still another embodiment of the present invention, there is provided a filling liquid for distribution of an ink jet head, which is to fill a nozzle flow path communicating with an ink discharge port during distribution of a thermal ink jet head, the ink discharge port of the ink jet head having an opening area of from 100 to 350 $\mu m^2$, the ink jet head including a water-repellent region formed on a periphery of the ink discharge port, the filling liquid for distribution including: an aqueous medium containing at least a water-soluble organic compound and water as constituents; and a dye dissolved in the aqueous medium, in which: the dye is contained in a concentration of 0.2 mass % or more and 1 mass % or less with respect to a total mass of the filling liquid for distribution and in a concentration equal to or less than saturation solubility with respect to the water-soluble organic compound; and the filling liquid for distribution has a surface tension of 35 mN/m or more.

According to still another embodiment of the present invention, there is provided a thermal ink jet head, including: an ink discharge port having an opening area of from 100 to 350 $\mu m^2$; a water-repellent region formed on a periphery of the ink discharge port, in which a nozzle flow path communicating with the ink discharge port is filled with the above-mentioned filling liquid for distribution.

According to still another embodiment of the present invention, there is provided a distribution method for an ink jet head for distributing a thermal ink jet head, using, as the ink jet head, an ink jet head including an ink discharge port having an opening area of from 100 to 350 $\mu m^2$ and a water-repellent region formed on a periphery of the ink discharge port, the distribution method including distributing the ink jet head while the filling liquid for distribution fills a nozzle flow path communicating with the ink discharge port.

The filling liquid for distribution, the ink jet head, and the method of distributing the ink jet head according to the invention can effectively prevent the degradation in discharge performance and print quality, in particular, the occurrence of the "misdirection print" caused by the thickening and solidification of the ink for the long-term conservation, the contamination of the surface of the heater, and the pool on the periphery of the discharge port.

Further features of the present invention will become apparent from the following description of exemplary embodiments with reference to the attached drawings.

BRIEF DESCRIPTION OF THE DRAWINGS

FIG. 6 is a process diagram illustrating another flow of the print test of the ink jet head of the present invention.

DESCRIPTION OF THE EMBODIMENTS

First Embodiment

Figure 1A:
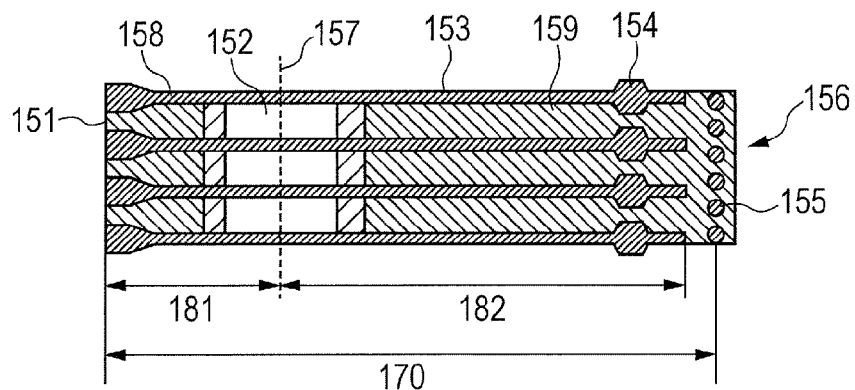
FIG. 1A is a top view schematically illustrating an internal structure of a nozzle of an ink jet head.

The present invention is hereinafter described in detail. It should be noted that the present invention is not limited to the following embodiments and includes all the subject matters including the matters specifying the invention. It should be noted that the term "distribution" as used herein refers to a general distribution process of a product from a producer (manufacturer) to a consumer (user) and includes all the steps from the production of a product by a producer (manufacturer) to the start of the use of the product by a consumer (user), such as packing and conservation before and after transport, as well as transport.

[1] Filling Liquid for Distribution:

The term "filling liquid for distribution" refers to a liquid which is to fill a nozzle flow path communicating with an ink discharge port during distribution of a thermal ink jet head. The filling liquid for distribution is caused to fill the nozzle flow path by a producer (manufacturer) prior to distribution of the ink jet head. Then, the filling liquid for distribution is replaced by ink for printing (recording liquid) at a time of use of the ink jet head by a consumer (user) and discharged out of the ink jet head. The filling liquid for distribution of the present invention can be preferably used for an ink jet head in which an ink discharge port has a small aperture with an opening area of 100 to 350 $\mu m^2$ and a hydrophilic head in which a hydrophilic region is formed on the periphery of an ink discharge port.

The filling liquid for distribution of the present invention is obtained by dissolving a dye in an aqueous medium containing at least a water-soluble organic compound and water as constituents.

[1-1] Dye:

The filling liquid for distribution of the present invention contains a dye as a coloring material. When the filling liquid for distribution contains a predetermined amount of the dye, the degradation in hydrophilicity caused by the adhesion of impurities contained in a trace amount in the aqueous medium (water, water-soluble organic compound, etc.), constituent materials for an ink jet head, and the like to a hydrophilic region of the ink jet head can be effectively prevented. The reason for using the dye instead of a pigment as a coloring material is the following: unlike pigment particles, dye particles are unlikely to be sedimented or fixed to an ink discharge port, and hence the dye does not easily cause inconveniences such as "misdirection print" and clogging of a nozzle (occurrence of a non-discharge nozzle) caused by the fixation of the particles. Further, when the filling liquid for distribution contains a predetermined amount of the dye, a print test can be performed with the filling liquid for distribution.

Although there is no particular limitation on a molecular structure and the like of the dye, it is preferred to use a water-soluble dye. For example, a yellow dye, a red dye, a violet dye, a blue dye, a black dye, and the like listed below can be preferably used. It should be noted that in order to use a yellow dye having low visibility in a print test, it is necessary to make the yellow dye visible by a method of, for example, coloring a recording medium for a print test with a blue dye in advance or irradiating a printed pattern formed of the yellow dye with light such as black light or LED light.

[1-1A] Yellow Dye:

Examples of the yellow dye may include C.I. Direct Yellow, C.I. Acid Yellow, C.I. Reactive Yellow, and C.I. Food Yellow. Specifically, the following dyes are preferably used:

(1) C.I. Direct Yellow 8, 11, 12, 27, 28, 33, 39, 44, 50, 58, 85, 86, 87, 88, 89, 98, 100, 110, 132, and 142;

(2) C.I. Acid Yellow 1, 3, 7, 11, 17, 23, 25, 29, 36, 38, 40, 42, 44, 76, 98, and 99;

(3) C.I. Reactive Yellow 2, 3, 17, 25, 37, and 42;

(4) C.I. Food Yellow 3; and the like.

[1-1B] Red Dye:

Examples of the red dye may include C.I. Direct Red, C.I. Acid Red, C.I. Reactive Red, and C.I. Food Red. Specifically, the following dyes are preferably used:

(1) C.I. Direct Red 2, 4, 9, 11, 20, 23, 24, 31, 39, 46, 62, 75, 79, 80, 83, 89, 95, 197, 201, 218, 220, 224, 225, 226, 227, 228, 229, and 230;

(2) C.I. Acid Red 6, 8, 9, 13, 14, 18, 26, 27, 32, 35, 37, 42, 51, 52, 80, 83, 87, 89, 92, 106, 114, 115, 133, 134, 145, 158, 198, 249, 265, and 289;

(3) C.I. Reactive Red 7, 12, 13, 15, 17, 20, 23, 24, 31, 42, 45, 46, and 59;

(4) C.I. Food Red 87, 92, and 94; and the like.

[1-1C] Violet Dye:

An example of the violet dye may be C.I. Direct Violet. Specifically, C.I. Direct Violet 107 and the like are preferably used.

[1-1D] Blue Dye:

Examples of the blue dye may include C.I. Direct Blue, C.I. Acid Blue, and C.I. Reactive Blue. Specifically, the following dyes are preferably used:

(1) C.I. Direct Blue 1, 15, 22, 25, 41, 76, 77, 80, 86, 87, 90, 98, 106, 108, 120, 158, 163, 168, 199, and 226;

(2) C.I. Acid Blue 1, 7, 9, 15, 22, 23, 25, 29, 40, 43, 59, 62, 74, 78, 80, 90, 100, 102, 104, 117, 127, 138, 158, and 161;

(3) C.I. Reactive Blue 4, 5, 7, 13, 14, 15, 18, 19, 21, 26, 27, 29, 32, 38, 40, 44, and 100; and the like.

[1-1E] Black Dye:

Examples of the black dye may include C.I. Direct Black, C.I. Acid Black, and C.I. Food Black. Specifically, the following dyes are preferably used:

(1) C.I. Direct Black 17, 19, 22, 31, 32, 51, 62, 71, 74, 112, 113, 154, 168, and 195;

(2) C.I. Acid Black 2, 48, 51, 52, 110, 115, and 156;

(3) C.I. Food Black 1 and 2; and the like.

The dye is contained in the filling liquid for distribution in a concentration of 0.2 mass % or more and 1 mass % or less with respect to the total mass of the filling liquid for distribution. When the concentration of the dye is set to 0.2 mass % or more, the degradation in hydrophilicity caused by the adhesion of a trace amount of impurities contained in the aqueous medium (water, water-soluble organic compound, etc.), constituent materials for an ink jet head, and the like to a hydrophilic region of the ink jet head can be effectively prevented. When the concentration of the dye is set to 1 mass % or less, the "misdirection print" and clogging of a nozzle (occurrence of a non-discharge nozzle) caused by the fixation of the dye to an ink discharge port can be effectively prevented. Further, ink contamination caused by color mixing during replacement of the filling liquid by ink for recording can be prevented. In order to produce the above-mentioned effects surely, it is preferred that the dye be contained in a concentration of 0.3 mass % or more and 0.8 mass % or less with respect to the total mass of the filling liquid for distribution.

It should be noted that in the case where a plurality of ink jet heads (for example, four colors of cyan, magenta, yellow, and black (CMYK)) are mounted on an ink jet recording device, it is preferred that filling liquids for distribution for all the ink jet heads have the same composition.

The dye is contained in the filling liquid for distribution in a concentration equal to or less than saturation solubility with respect to the water-soluble organic compound. When the concentration of the dye is set to the saturation solubility or less, even if volatile components (water, etc.) in the aqueous medium are volatilized, the dissolved state of the dye can be kept. Thus, the "misdirection print" and clogging of a nozzle (occurrence of a non-discharge nozzle) caused by the thickening or fixation of the dye to an ink discharge port can be effectively prevented. It should be noted that the term "saturation solubility" as used herein refers to a saturation solubility at 25° C.

The saturation solubility of the dye with respect to the water-soluble organic compound can be determined, for example, by gradually changing the amount of the dye to be added with respect to 100 g (grams) of the water-soluble compound at 25° C. to prepare dye solutions having different concentrations, measuring the respective dye solutions for absorbance, filtering the dye solutions with a membrane filter having a pore diameter of 1 μm, measuring the dye solutions for absorbance again, and determining the saturation solubility from the dye concentration of the dye solution whose absorbance varies before and after the filtration. For example, the saturation solubility of C.I. Food Black 2 (FB2) with respect to glycerin is 4 (g/100 g), the saturation solubility of C.I. Food Black 2 (FB2) with respect to diethylene glycol is 16 (g/100 g), and the saturation solubility of C.I. Food Black 2 (FB2) with respect to triethylene glycol is 21 (g/100 g).

[1-2] Aqueous Medium:

In the filling liquid for distribution of the present invention, the dye is dissolved in an aqueous medium containing at least a water-soluble organic compound and water as constituents.

[1-2A] Water-Soluble Organic Compound:

The term "water-soluble organic compound" as used herein refers to an organic compound which is freely miscible in water or which has a solubility (at 25° C.) of 20 g/100 g or more with respect to water. Further, in the present invention, it is preferred that the water-soluble organic compound be a water-soluble organic solvent having a vapor pressure of 3 Pa or less at 20° C., that is, a hardly volatile compound. By using such compound, even in the case where volatile components (water, etc.) in the aqueous medium are volatilized, the dissolved state of the dye can be kept, and the precipitation and solidification of the dye can be prevented. Further, it is preferred that the water-soluble organic compound exhibit solubility with respect to the dye.

The molecular structure and the like of the water-soluble organic compound are not particularly limited, and examples thereof may include water-soluble solvents such as a polyhydric alcohol, an ester, a lower alkoxy alcohol, an amine, an amide, and a heterocycle described below.

(1) Polyhydric Alcohol:

Diethylene glycol, triethylene glycol, tetraethylene glycol, polyethylene glycol, dipropylene glycol, tripropylene glycol, 1,3-propylene glycol, isopropylene glycol, polypropylene glycol, pentamethylene glycol, trimethylene glycol, butylene glycol, isobutylene glycol, thiodiglycol, 1,2-hexanediol, 2-ethyl-1,3-hexanediol, 1,2-pentanediol, 1,5-pentanediol, 2-methyl-2,4-pentanediol, 1,3-propanediol, 1,4-butanediol, 1,7-heptanediol, 1,8-octanediol, 2-butene-1,4-diol, glycerin, diglycerin, or the like.

(2) Ester:

γ-Butyrolactone, diacetin, triethyl phosphate, or the like.

(3) Lower Alkoxy Alcohol:

2-Methoxyethanol, 2-ethoxyethanol, or the like.

(4) Amine:

Ethanolamine, diethanolamine, triethanolamine, N-methyldiethanolamine, N-ethyldiethanolamine, triethylenetetramine, tetraethylenepentamine, pentamethyldiethylenetriamine, or the like.

(5) Amide:

Formamide, N,N-dimethylformamide, N-methylformamide, N,N-dimethylacetamide, or the like.

(6) Heterocycle:

2-Pyrrolidone, N-ethylpyrrolidone, N-methyl-2-pyrrolidone, cyclohexylpyrrolidone, morpholine, N-ethylmorpholine, 2-oxazolidone, 1,3-dimethyl-2-imidazolidinone, imidazole, methylimidazole, hydroxyimidazole, dimethylaminopyridine, 1,3-propanesultone, hydroxyethylpiperazine, piperazine, or the like.

Of those, as the water-soluble organic solvent having a vapor pressure of 3 Pa or less at 20° C., there may be given diethylene glycol (2.7 Pa), triethylene glycol (0.02 Pa), glycerin (<0.01 Pa), and the like. Of those, glycerin is particularly preferred.

As the water-soluble organic compound, a solution obtained by dissolving a water-soluble organic compound in a solid form at 20° C. in the water-soluble organic solvent can also be used besides the water-soluble organic solvent. The solution is preferably a solution in which 1 g or more of the water-soluble organic compound in a solid form are dissolved in 100 g of the water-soluble organic solvent at room temperature (20° C.), more preferably a solution in which 5 g or more of the water-soluble organic compound in a solid form are dissolved in 100 g of the water-soluble organic solvent at room temperature (20° C.). There is no particular limitation on a specific structure of the water-soluble organic compound in a solid form, and for example, there may be given: ureas such as urea and ethylene urea; polyhydric alcohols in a solid form at room temperature (20° C.) such as 1,6-hexanediol, inositol, and trimethylolpropane; and saccharides such as glucose and sorbitol. In particular, ethylene urea is preferred from the viewpoint of its high water solubility. As a water-soluble organic solvent for dissolving the water-soluble organic compound in a solid form, glycerin, triethylene glycol, tetraethylene glycol, or the like is preferred.

The concentration of the water-soluble organic compound with respect to the total mass of the filling liquid for distribution is preferably 40 mass % or less, more preferably 35 mass % or less. When the concentration is set to 40 mass % or less, the filling liquid for distribution is unlikely to remain in a nozzle flow path when the filling liquid for distribution is replaced by ink for printing, which can minimize the recovery operation for ink replacement. In order to produce the effect of adding the water-soluble organic compound, the concentration is preferably 15 mass % or more, more preferably 20 mass % or more. The water-soluble organic compound may be used alone or in combination of two or more kinds.

[1-2B] Water:

As water, it is preferred that ion-exchanged water be used. The content of the water is preferably 30 mass % or more and 90 mass % or less with respect to the total mass of the filling liquid for distribution. When the content of the water is set to 30 mass % or more, the dye and the water-soluble organic compound can be hydrated, and the dye and the water-soluble organic compound can be prevented from being flocculated during distribution. On the other hand, when the content of the water is set to 90 mass % or less, the amount of the water-soluble organic compound increases relatively, and even in the case where volatile components (water, etc.) in the aqueous medium are volatilized, the dissolved state of the dye can be kept and the precipitation and solidification of the dye can be prevented. In order to produce the above-mentioned effect more reliably, it is more preferred that the content of the water be set to 55 mass % or more and 85 mass % or less.

[1-2C] Surfactant:

It is preferred that the aqueous medium contain a surfactant. The surfactant has the effect of enhancing discharge stability of the filling liquid for distribution and the effect of adjusting surface tension and wettability of the filling liquid for distribution. Although the kind of the surfactant is not particularly limited, it is preferred to use a nonionic surfactant. In particular, a nonionic surfactant having high hydrophilicity with a hydrophile-lipophile balance (HLB) value of 10 or more is preferred. Specifically, it is preferred to use a polyoxyethylene alkyl ether, an ethylene oxide adduct of acetylene glycol, or the like.

In order to produce the effect of enhancing discharge stability, the content of the surfactant is set to preferably 0.1 mass % or more, more preferably 0.2 mass % or more, particularly preferably 0.3 mass % or more with respect to the total mass of the filling liquid for distribution. On the other hand, in order to suppress an increase in viscosity by excess addition of the surfactant, the content of the surfactant is set to preferably 3 mass % or less, more preferably 2 mass % or less, particularly preferably 1 mass % or less with respect to the total mass of the filling liquid for distribution.

[1-2D] Other Additive:

An additive other than the surfactant may be added in the aqueous medium depending on purposes. Examples of such additive may include an anti-foaming agent, an antiseptic, an anti-mold agent, a pH regulator, and an antioxidant.

[1-3] Surface Tension:

The surface tension of the filling liquid for distribution is adjusted to 25 mN/m or more and 34 mN/m or less. When the surface tension is set to 25 mN/m or more, the meniscus of an ink discharge port can be kept, and the inconvenience of the outflow of the filling liquid for distribution from the ink discharge port during distribution can be prevented. When the surface tension is set to 34 mN/m or less, the degradation in hydrophilicity of a hydrophilic region formed on the periphery of the ink discharge port can be prevented. Thus, when the filling liquid for distribution is replaced by a recording liquid so as to perform printing, increases in misdirection print and satellites can be prevented.

The surface tension of the filling liquid for distribution refers to a value measured by a plate method using a platinum plate with an automatic surface tensiometer (for example, "CBVP-Z type" manufactured by Kyowa Interface Science Co., LTD.) under the conditions of a temperature of 25° C. and a humidity of 50%. The surface tension of the filling liquid for distribution can be adjusted by, for example, the addition amount of the surfactant, and the kind and content of the water-soluble organic solvent.

[1-4] Viscosity:

The viscosity of the filling liquid for distribution is preferably 1.3 mPa·s or more and 5.0 mPa·s or less. When the viscosity of the filling liquid for distribution is set in the above-mentioned range, a print test can be performed with the filling liquid for distribution. This will be described specifically in the section of a distribution method.

The viscosity of the filling liquid for distribution refers to a value measured with an E-type viscometer (for example, "RE-80L viscometer" (trade name) manufactured by Toki Sangyo Co., Ltd.) under the condition of a temperature of 25° C. according to JIS Z 8803. The viscosity of the filling liquid for distribution can be adjusted by, for example, the addition amount of the surfactant and the addition amount of the water-soluble organic compound.

[2] Ink Jet Head:

An ink jet head according to an embodiment of the present invention will be hereinafter described with reference to FIGS. 1A to 1C and FIGS. 2A to 2C. It should be noted that the ink jet head of the present invention is not limited to the configuration described below.

Figure 1B:
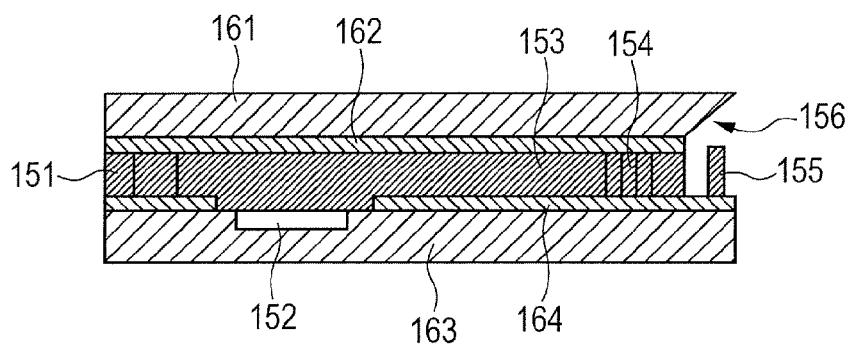
FIG. 1B is a side view schematically illustrating the internal structure of the nozzle illustrated in FIG. 1A.
Figure 1C:
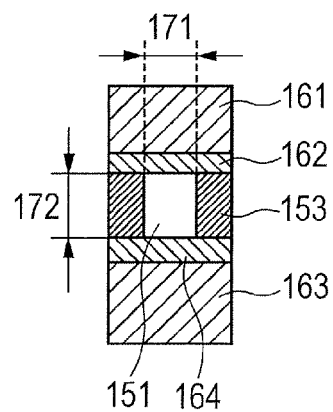
FIG. 1C is a front view schematically illustrating an ink discharge port of the nozzle illustrated in FIG. 1A.

[2-1] Structure of Nozzle Portion:

First, a structure of a nozzle portion is described with reference to FIGS. 1A to 1C. FIG. 1A is a top view schematically illustrating an internal structure of a nozzle of an ink jet head. FIG. 1B is a side view schematically illustrating the internal structure of the nozzle illustrated in FIG. 1A. FIG. 1C is a front view schematically illustrating an ink discharge port of the nozzle illustrated in FIG. 1A.

The ink jet head of the present invention is a thermal ink jet head. In the thermal ink jet head, as illustrated in the figures, a plurality of nozzle flow paths 159 partitioned by nozzle walls 153 are formed, a plurality of ink discharge ports 151 communicating with the nozzle flow paths 159 are formed, and a heater 152 is disposed in each of the nozzle flow paths 159. In the illustrated embodiment, a nozzle filter 155 configured to trap foreign matters floating in an ink flow path in the ink jet head is disposed between the nozzle flow paths 159 and a common liquid chamber 156. Further, a top board member 161 to which a nozzle top board 162 is attached includes an ink supply opening (not shown) formed by anisotropic etching or the like so as to allow outside ink to be introduced from the common liquid chamber 156 to the nozzle flow paths 159.

Right and left side surfaces of each nozzle flow path 159 are partitioned by the nozzle walls 153. In addition, an upper surface side of the nozzle flow path 159 is partitioned by the nozzle top board 162, and a bottom surface side thereof is partitioned by a nozzle bottom board 164. That is, the nozzle flow path 159 is an inner space having a substantially quadrangular prism shape partitioned from a surrounding space with the nozzle walls 153, the nozzle top board 162, and the nozzle bottom board 164 being partition walls. The nozzle top board 162 is stacked on the top board member 161 formed of Si or the like, and the nozzle bottom board 164 is stacked on a bottom board portion 163.

The ink discharge port 151 is an opening for discharging ink formed at one end of the nozzle flow path 159 and communicates with the common liquid chamber 156 via the nozzle flow path 159. The ink discharge port 151 is formed on a face surface. In the illustrated example, the face surface is formed integrally with the nozzle walls 153, but may be formed by providing a face plate separately. The opening area of the ink discharge port 151 is set to 100 to 350 μm². When the opening area is set to 100 μm² or more, the occurrence of a non-discharge nozzle can be prevented. On the other hand, when the opening area is set to 350 μm² or less, minute liquid droplets in which the amount of one droplet of ink is 10 pL or less can be formed, and a resolution of 600 dpi or more can be achieved. It should be noted that the opening area is represented by a product of a discharge port width 171 and a discharge port height 172.

A plurality of nozzle flow paths form a nozzle row. The number of nozzle flow paths forming a nozzle row is not particularly limited. However, in order to produce the effects of the present invention, it is preferred that the number of nozzle flow paths per inch be 600 to 2,400 and the length of the nozzle row be 2 inches or more.

The heater 152 is a heating unit configured to generate bubbles in ink filling the nozzle flow path 159 by heating. The heater 152 is disposed on the bottom board portion 163. As the heater 152, a resistor (for example, a resistor made of tantalum nitride or the like) can be used. Electrodes (not shown) made of aluminum or the like for electric conduction are connected to the heater 152, and a switching transistor (not shown) configured to control the electric conduction to the heater 152 is connected to one of the electrodes. The drive of the switch transistor is controlled by an integrated circuit (IC) formed of a circuit such as a gate element for control, and the switch transistor is driven with a predetermined pattern by a signal from outside of the ink jet head.

It is preferred that the total length of a nozzle be set to 200 μm or more and 300 μm or less. The "total length of a nozzle" in this case refers to the length of the nozzle flow path 159 and specifically refers to a length from an end on the ink discharge port 151 side to an end on the common liquid chamber 156 side of the nozzle wall 153 forming the nozzle flow path 159.

The nozzle flow path 159 is divided into a nozzle front portion 181 which is a portion from a heater center 157 to the end on the ink discharge port 151 side and a nozzle back portion 182 which is a portion from the heater center 157 to the end on the common liquid chamber 156 side. From the viewpoint of a discharge speed, it is preferred that a flow resistance of the nozzle front portion 181 (front resistance) and a flow resistance of the nozzle back portion 182 (back resistance) satisfy a value of front resistance/back resistance of 0.3 to 0.8. It should be noted that a flow resistance can be determined by calculation according to the Hagen-Poiseuille law from values such as a flow path sectional area, flow path length, and viscosity of ink to be discharged. That is, if ink to be used (and its viscosity) is determined, the value of front resistance/back resistance can be adjusted by the flow path sectional area of a nozzle, flow path length, and the like.

[2-2] Hydrophilic Region:

In the ink jet head of the present invention, a hydrophilic region is formed on the periphery of an ink discharge port. It is preferred that a hydrophilic region having a contact angle of 60° or less with respect to the filling liquid for distribution be formed on the periphery of the ink discharge port, and it is more preferred that a hydrophilic region having a contact angle of 0° (that is, forming no contact angle) be formed. The contact angle can be measured by an ATAN1/2θ method through use of a contact angle meter (for example, "SImage-mini" (trade name) manufactured by Excimer Inc.) according to JIS R 3257. The term "filling liquid for distribution" as used herein refers to the filling liquid for distribution of the present invention, and it is preferred that the surface tension of the filling liquid for distribution be 25 mN/m or more and 34 mN/m or less.

The hydrophilic region can be formed by a method of forming a member (face member) in which an ink discharge port is formed through use of a hydrophilic material, a method of subjecting the surface (face surface) of the face member to a hydrophilic treatment, a method of providing a hydrophilic film to the face surface, or the like.

In the method of forming a face member through use of a hydrophilic material, a resin such as an epoxy resin, in particular, an epoxy-based photosensitive resin can be used as the hydrophilic material.

As the method of subjecting a face surface to a hydrophilic treatment, there may be given a method of roughening a face surface. Examples of the surface roughening method may include laser irradiation, UV/O$_3$ treatment, plasma treatment, heat treatment, oxidation treatment, and embossing treatment. Lasers which may be used in the laser irradiation include an excimer laser, a YAG laser, a CO$_2$ laser, and the like. Further, a peripheral portion of an ink discharge port may also be treated by a method of soaking the peripheral portion in a liquid having high hydrophilicity for a long period of time. As the "liquid having high hydrophilicity", there may be given pigment ink and the like. For example, it is appropriate that a face member be soaked in pigment ink for 10 minutes or more.

As the method of providing a hydrophilic film to a face surface, there may be given a method of forming a metal film or a hydrophilic resin film on a face surface. Needless to say, the hydrophilic film has hydrophilicity, and the hydrophilic film is preferably formed of a material having satisfactory adhesiveness with respect to a face member. As such material, for example, there may be given a composition containing a water-soluble resin and a water-insoluble low molecular weight compound. For example, the hydrophilic film can be formed by dissolving a water-soluble resin (hydroxypropyl cellulose, etc.) and a water-insoluble low molecular weight compound (bisphenol A, etc.) in an appropriate solvent (dimethylformamide, etc.), applying the obtained solution to a face surface, drying the solution, and treating the dried solution with alcohol or the like as needed.

It is appropriate that the method of forming a hydrophilic region be selected as appropriate depending on the material forming a face member. Further, the hydrophilic region may be formed by a combination of two or more kinds of the above-mentioned methods. Of the above-mentioned methods, preferred is a method of forming a nozzle peripheral portion through use of an epoxy-based photosensitive resin, treating the nozzle peripheral portion with UV/O$_3$, and subjecting the nozzle peripheral portion to a hydrophilic treatment by soaking it in pigment ink.

[2-3] Nozzle Member:

The nozzle wall 153, the nozzle top board 162, and the nozzle bottom board 164 partitioning the nozzle flow path 159 can each be formed of, for example, a photosensitive resin. As the photosensitive resin, for example, there may be given a negative resist using a radical polymerization reaction and a negative resist using a cationic polymerization reaction.

The negative resist using a radical polymerization reaction is cured when polymerization and cross-linking proceed between molecules of a monomer or prepolymer which is radical-polymerizable contained in the resist thorough use of a radical generated from a photopolymerization initiator contained in the resist. Examples of the photopolymerization initiator may include a benzoin, a benzophenone, a thioxanthone, an anthraquinone, an acylphosphine oxide, a titanocene, and an acridine. The kind of the monomer or prepolymer is not particularly limited, and, for example, a monomer or prepolymer having the following group is preferred: an acryloyl group, a methacryloyl group, an acrylamide group, a maleic acid diester, or an allyl group.

The negative resist using a cationic polymerization reaction is cured when polymerization and cross-linking proceed between molecules of a monomer or prepolymer which is cationic-polymerizable contained in the resist through use of a cation generated from a photocationic initiator contained in the resist. Examples of the photocationic initiator may include an aromatic iodonium salt and an aromatic sulfonium salt. Specific examples thereof may include "ADEKA OPTOMER SP-170" and "SP-150" manufactured by ADEKA CORPORATION, "BBI-103" and "BBI-102" manufactured by Midori Kagaku Co., Ltd., "Rhodorsil Photoinitiator 2074" manufactured by Rhodia, and "IBPF", "IBCF", "TS-01", and "TS-91" manufactured by SANWA Chemical Co., Ltd. The kind of the monomer or prepolymer is not particularly limited, and, for example, a monomer or prepolymer having the following group is preferred: an epoxy group, a vinyl ether group, or an oxetane group. Specific examples thereof may include a bisphenol A-type epoxy resin, a novolac-type epoxy resin, and a bisphenol novolac-type epoxy resin. Specific examples thereof may include alicyclic epoxy resins such as "ARON OXETANE OXT-121" manufactured by TOAGOSEI CO., LTD., and "CELLOXIDE 2021", "GT-300 series", "GT-400 series", and "EHPE3150" manufactured by DAICEL CORPORATION.

In addition, the following may be used as the negative photoresist: "SU-8 series" and "KMPR-1000" manufactured by Kayaku MicroChem Corporation, "TMMR", "TMMR S2000", and "TMMF S2000" manufactured by TOKYO OHKA KOGYO CO., LTD., and the like.

In the present invention, an epoxy-based photosensitive resin excellent in solvent resistance and strength as a nozzle wall is preferably used. "TMMR S2000" manufactured by TOKYO OHKA KOGYO CO., LTD. is particularly preferred as a specific commercially available product.

Figure 2A:
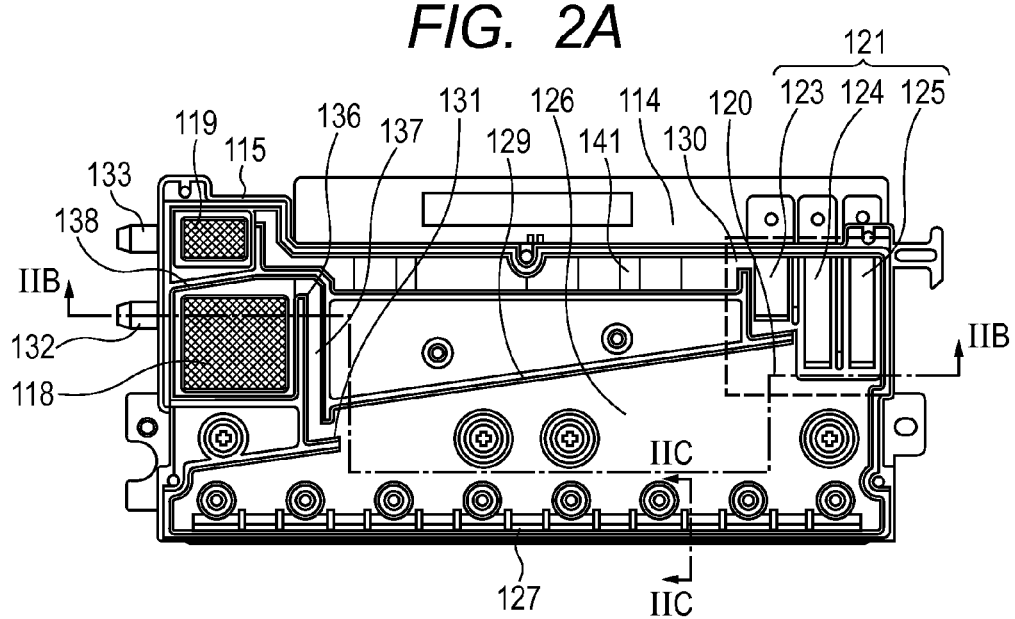
FIG. 2A is a front view schematically illustrating an ink jet head of the present invention.
Figure 2B:
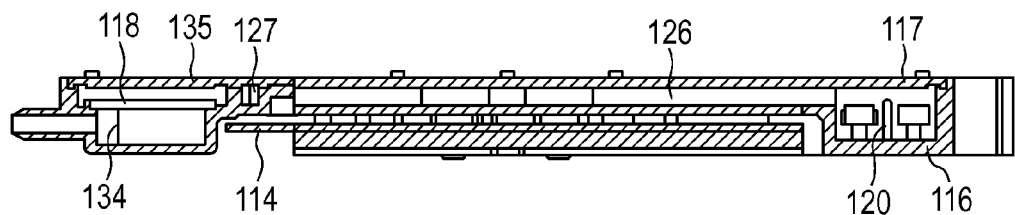
FIG. 2B is a sectional view of the ink jet head taken along line IIB-IIB of FIG. 2A.
Figure 2C:
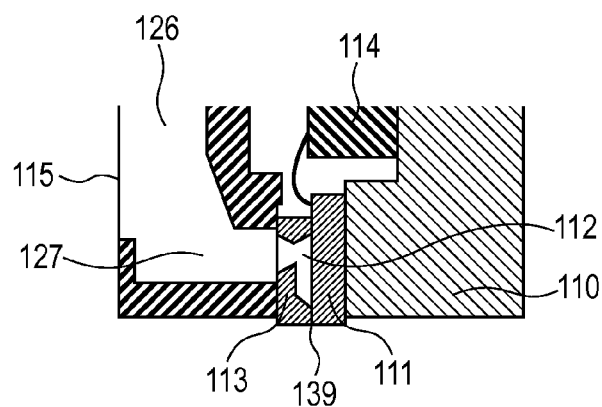
FIG. 2C is a sectional view of the ink jet head taken along line IIC-IIC of FIG. 2A.

[2-4] Entire Structure of Ink Jet Head:

Next, the entire structure of the ink jet head will be described with reference to FIGS. 2A to 2C. FIG. 2A is a front view illustrating a structure example of the ink jet head of the present invention. FIG. 2B is a sectional view taken along line IIB-IIB of FIG. 2A. FIG. 2C is a sectional view taken along line IIC-IIC of FIG. 2A. For convenience of the description, a liquid supply case cover is omitted in the front view.

As illustrated in the figures, the ink jet head preferably includes: a common liquid chamber 112 communicating with a plurality of nozzle flow paths; an opening communicating with the common liquid chamber 112; a main liquid supply chamber 126 communicating with the opening; a liquid supply port 127 communicating with the main liquid supply chamber 126; a liquid supply chamber (first liquid supply chamber 134 and second liquid supply chamber 135) communicating with the liquid supply port 127; a supply filter 118 provided so as to separate the liquid supply chamber into the first liquid supply chamber 134 and the second liquid supply chamber 135 from an upstream side along a flow during liquid supply; a gas-liquid separation portion 120 provided in part of the main liquid supply chamber 126; and an air chamber 141 communicating with the gas-liquid separation portion 120.

Further, it is preferred that the nozzle flow paths, the common liquid chamber 112, the opening, the main liquid supply chamber 126, the liquid supply port 127, the liquid supply chamber (the first liquid supply chamber 134 and the second liquid supply chamber 135), the supply filter 118, the gas-liquid separation portion 120, and the air chamber 141 be disposed on a plane parallel to a plane including an arrangement direction of the nozzle flow paths and a discharge direction of the liquid, and the main liquid supply chamber 126, the liquid supply port 127, the supply filter 118, the gas-liquid separation portion 120, and the air chamber 141 be disposed without being stacked on top of one another.

A base plate 110 made of ceramic supports a heater substrate 111 made of silicon. On the heater substrate 111, a plurality of electrothermal converters (heaters or energy generation portions) serving as discharge energy generation elements for a liquid and a plurality of flow path walls for forming nozzles corresponding to the electrothermal converters are formed. Further, a liquid chamber frame surrounding the common liquid chamber 112 communicating with each nozzle is also formed on the heater substrate 111. A top board 113 forming the common liquid chamber 112 is connected onto a side wall of the nozzle and the liquid chamber frame thus formed. Thus, the heater substrate 111 and the top board 113 are stacked so as to adhere to the base plate 110 under the condition of being integrated with each other. Such lamination and adhesion are performed with an adhesive having a satisfactory heat conductivity such as silver paste. In a back portion of the heater substrate 111 on the base plate 110, a mounted printed circuit board (PCB) 114 is supported through use of a double-sided tape (not shown). Each discharge energy generation element on the heater substrate 111 and the PCB 114 are electrically connected to each other by wire bonding corresponding to each wiring.

A liquid supply member 115 is connected to an upper surface of the top board 113. The liquid supply member 115 is formed of a liquid supply case 116 and a liquid supply case cover 117. When the liquid supply case cover 117 closes the upper surface of the liquid supply case 116, a liquid chamber and a liquid supply path to be described later are formed. In this embodiment, the liquid supply case 116 and the liquid supply case cover 117 are connected to each other through use of a thermosetting adhesive. Further, the liquid supply case 116 is provided with the supply filter 118 and a discharge filter 119. The supply filter 118 serves to remove foreign matters in a liquid supplied to the liquid supply member 115, and the discharge filter 119 serves to prevent foreign matters from entering from outside of the liquid discharge head. Each filter is fixed to the liquid supply case 116 by heat fusion. Further, the gas-liquid separation portion 120 is formed in part of the liquid supply case 116, and a liquid surface detection sensor 121 is mounted from outside so as to protrude to the gas-liquid separation portion 120. Thus, the amount of a liquid in the liquid chamber is controlled as described above.

Hereinafter, the configuration of the liquid chamber, the liquid supply path, and the like formed by fitting of two components: the liquid supply case 116 and the liquid supply case cover 117 will be described. In a connection surface of the liquid supply case 116 with respect to the top board 113, a rectangular opening (hereinafter referred to as "liquid supply port 127") is formed substantially in parallel to an arrangement direction of nozzles over the width of the nozzle row, and the main liquid supply chamber 126 in a reservoir chamber shape is formed in an extended portion of the liquid supply port 127. That is, the main liquid supply chamber 126 is formed substantially in parallel to the nozzle row over the width of the nozzle row. Further, a top surface on an opposed side of the liquid supply port 127 forms a slope with the gas-liquid separation portion 120 being an uppermost portion (hereinafter referred to as "main liquid supply chamber slope 129") substantially over the entire region. The main liquid supply chamber slope 129 has two openings, one of which is a liquid communication portion 131 and the other of which is the gas-liquid separation portion 120.

The gas-liquid separation portion 120 forms part of the main liquid supply chamber 126, and the depth of the part formed of the gas-liquid separation portion 120 is larger than that of the other part of the main liquid supply chamber 126. The purpose of this configuration is to enhance the effect of breaking air bubbles mixed in a liquid in the liquid chamber as described later. In the embodiment illustrated in FIG. 2A, three electrodes of stainless steel are mounted in the gas-liquid separation portion 120, and the electrodes are an upper limit detection electrode 123, a ground electrode 124, and a lower limit detection electrode 125 from the left side of FIG. 2A. The liquid surface in the main liquid supply chamber 126 is kept between the upper limit and the lower limit by the electric conduction between the ground electrode 124 and the upper limit detection electrode 123 and the electric conduction between the ground electrode 124 and the lower limit detection electrode 125. In the ink jet head of the embodiment illustrated in FIG. 2A, the reliability of detection can be enhanced by detecting the liquid surface of a liquid subjected to gas-liquid separation.

An air communication portion 130 is disposed on an extended portion of the gas-liquid separation portion 120, and the air chamber 141 serving as an air flow path is formed in a further extended portion. The discharge filter 119 described above is provided in a still further extended portion and communicates with a discharge joint 133. The discharge filter 119 is formed of a material having water repellency. Even if a liquid flows into the air flow path (air chamber 141) and ink adheres to the discharge filter 119 to form a meniscus of the ink in the discharge filter 119, the capillary force of a filter portion can be reduced by the water repellency and the ink can be removed easily.

On the other hand, the liquid supply port 127 is provided through intermediation of the liquid communication portion 131 provided at the main liquid supply chamber slope 129. The liquid supply portion 127 forms a tubular shape from the liquid communication portion 131 to the vicinity of the supply filter 118 and is formed on a plane which is substantially identical and parallel to that of the main liquid supply chamber 126. The supply filter 118 is also disposed on a plane which is substantially identical and parallel to that of the main liquid supply chamber 126. The supply filter 118 is provided so as to separate the liquid supply chamber into two chambers. The chamber on a side communicating with a supply joint 132, that is, the chamber on an upstream side along a flow of liquid supply in the liquid discharge head is defined as the first liquid supply chamber 134, and the chamber on a downstream side is defined as the second liquid supply chamber 135. The supply filter 118 is disposed on a plane which is substantially identical and parallel to that of the main liquid supply chamber 126, and hence the first liquid supply chamber 134 and the second liquid supply chamber 135 adjacent to both surfaces of the supply filter 118 are also disposed on a plane which is substantially parallel to that of the main liquid supply chamber 126 and a nozzle arrangement surface 139.

The second liquid supply chamber 135 has an opening (hereinafter referred to as "second liquid supply chamber opening 136") above the supply filter 118 and communicates with the liquid supply port 127 through the second liquid supply chamber opening 136. Further, a top surface of the second liquid supply chamber 135 is provided with a slope (hereinafter referred to as "second liquid supply chamber slope 138") with the second liquid supply chamber opening 136 being an uppermost portion.

As described above, the main liquid supply chamber 126, the gas-liquid separation portion 120, the liquid supply port 127, the supply filter 118, the first liquid supply chamber 134, and the second liquid supply chamber 135 are each provided on a plane which is substantially parallel to the nozzle arrangement surface 139. On the other hand, as illustrated in the cross-section taken along line IIB-IIB, it is important that the main liquid supply chamber 126, the liquid supply port 127, the supply filter 118, and the gas-liquid separation portion 120 be disposed so as not to overlap each other in a direction perpendicular to the plane.

In the ink jet head of the present invention, an ink jet head and an ink tank may be configured integrally or may be configured so as to be separable from each other. An ink jet head of the type in which an ink jet head and an ink tank are configured so as to be separable from each other may be distributed while the ink tank is not mounted, and in this distribution form, the sealability of a nozzle flow path is difficult to ensure and the ink jet head is liable to be degraded. In the ink jet head of the present invention, the filling liquid for distribution of the present invention fills nozzle flow paths, and hence the inconvenience such as discharge defects can be effectively prevented.

[2-5] Filling of Filling Liquid for Distribution:

The nozzle flow path communicating with the ink discharge port is filled with the filling liquid for distribution of the present invention. It is preferred that, in a hollow area in the ink jet head, at least a portion from the ink discharge port to the common liquid chamber (that is, the nozzle flow path and the common liquid chamber) be filled with the filling liquid for distribution. As the filling method, for example, there may be given a method of injecting a filling liquid for distribution into an ink tank, connecting the ink tank to an ink jet recording device, and filling a nozzle flow path of an ink jet head with the filling liquid for distribution by a suction operation.

Figure 3:
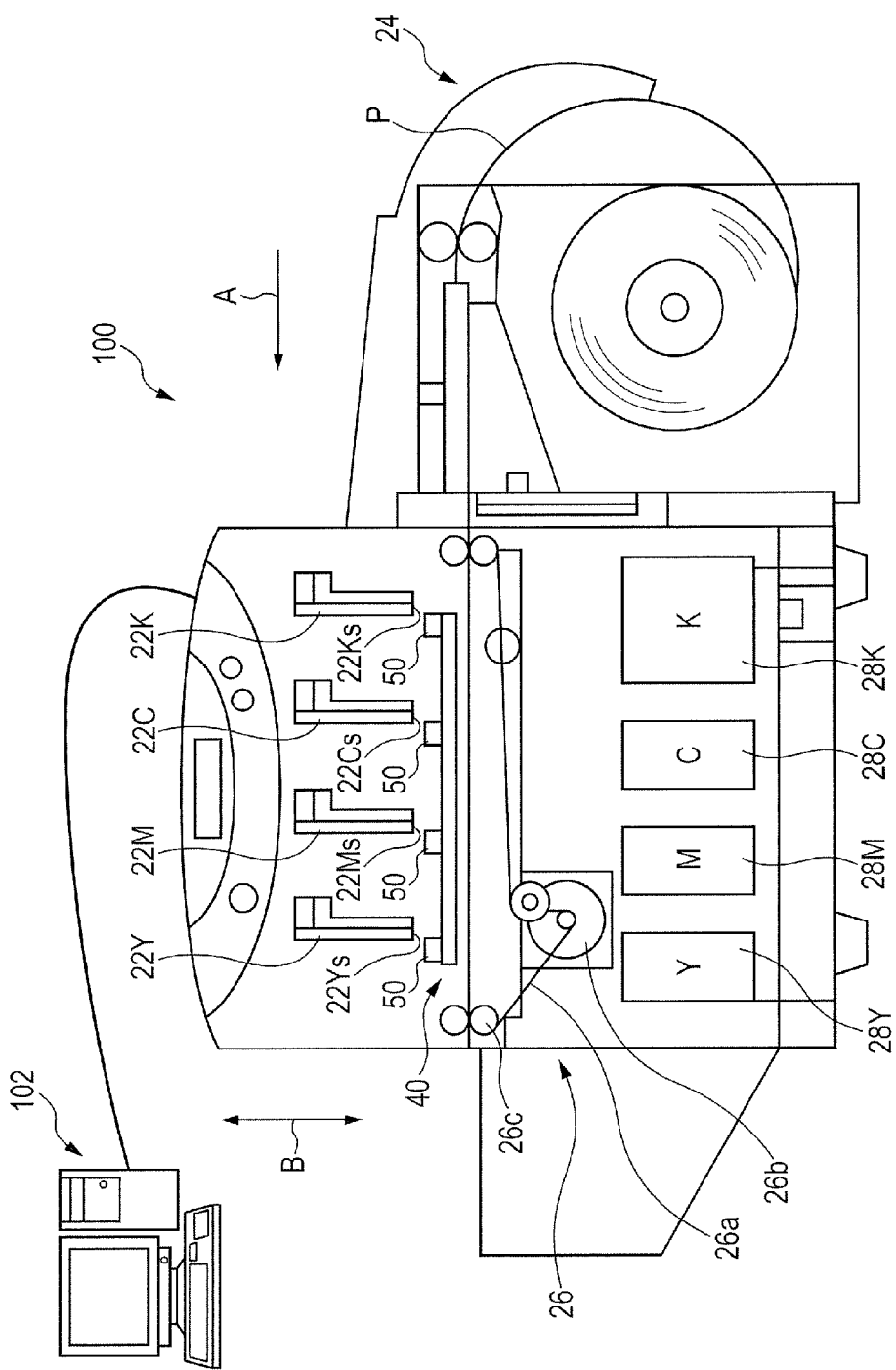
FIG. 3 is a front view schematically illustrating an entire configuration of an ink jet recording device.

[2-6] Ink Jet Recording Device:

Hereinafter, for reference, an ink jet recording device (hereinafter sometimes simply referred to as "recording device") to be used preferably for the ink jet head of the present invention will be described with reference to FIG. 3. FIG. 3 is a front view schematically illustrating the entire configuration of the ink jet recording device.

A recording device 100 illustrated in FIG. 3 is an example of a recording device using long heads 22 extending over the entire region in a width direction of a recording region of a recording medium P. The recording device 100 is connected to a host personal computer (PC) 102. The recording device 100 performs recording by discharging a liquid to the recording medium P from four ink jet heads (hereinafter simply referred to as "heads 22K, 22C, 22M, 22Y") based on recording information sent from the host PC 102. The recording medium P illustrated in FIG. 3 is roll paper. The four heads 22K, 22C, 22M, 22Y are arranged in a conveyance direction (direction indicated by the arrow A) of the recording medium P. The heads 22K (for black ink), 22C (for cyan ink), 22M (for magenta ink), 22Y (for yellow ink) are arranged in parallel to each other in the conveyance direction in the stated order. The heads 22K, 22C, 22M, 22Y are so-called line heads in which nozzles are arranged at a predetermined density in a direction crossing (in the figure, direction orthogonal to) the conveyance direction of the recording medium P. The arrangement width of the nozzles (arrangement range in the conveyance direction of the recording medium P) is set to a width equal to or more than the maximum recording width of the recording medium P to be used. The recording device 100 performs recording by driving a heater provided in each head 22 to discharge ink (recording liquid) from a nozzle without moving each head 22.

Along with the recording, foreign matters such as dust and ink droplets adhere to surfaces provided with ink discharge ports (face surfaces 22Ks, 22Cs, 22Ms, 22Ys) and the discharge state of each head 22 changes, which may influence the recording. Therefore, in order to enable the respective heads 22K, 22C, 22M, 22Y to discharge a liquid stably, a recovery unit 40 is incorporated in the recording device 100. By cleaning the face surfaces 22Ks, 22Cs, 22Ms, 22Ys on a regular basis with the recovery unit 40, the liquid discharge state from the nozzles of the heads 22K, 22C, 22M, 22Y can be recovered to an initial satisfactory discharge state. The recovery unit 40 includes caps 50 to be used for removing a liquid and fine air bubbles from the face surfaces 22Ks, 22Cs, 22Ms, 22Ys of the four heads 22K, 22C, 22M, 22Y during a cleaning operation. The caps 50 are provided independently for the heads 22K, 22C, 22M, 22Y.

The recording medium P is supplied from a supply unit 24, and conveyed in the direction indicated by the arrow A by a conveyance mechanism 26 incorporated in the recording device 100. The conveyance mechanism 26 includes a conveyance belt 26a configured to place the recording medium P thereon and conveying it, a conveyance motor 26b configured to rotate the conveyance belt 26a, a roller 26c configured to apply tension to the conveyance belt 26a, and the like. During recording, when the recording medium P reaches a position below the head 22K (for black ink) while being conveyed, black ink is discharged from the head 22K based on recording information sent from the host PC 102. Similarly, ink of each color is discharged from the heads 22C, 22M, and 22Y in the stated order to complete color recording to the recording medium P.

[3] Distribution Method

The distribution method of the present invention is a distribution method for a thermal ink jet head. The ink jet head of the present invention described above is used as the thermal ink jet head, and the ink jet head is distributed while nozzle flow paths communicating with ink discharge ports of the ink jet head are filled with the filling liquid for distribution of the present invention. The distribution method of the present invention includes both the form in which heads are distributed alone and the form in which the heads are distributed while being mounted on the ink jet recording device. As the form in which the heads are distributed while being mounted on the ink jet recording device, for example, there may be given the form in which capped heads are distributed while being mounted on a main body of an ink jet recording device.

Even when an aqueous medium is volatilized during distribution, the dissolved state of a dye can be kept by using the filling liquid for distribution of the present invention. Therefore, it is not necessary to seal, for example, ink discharge ports with head caps or face surface tapes at a time of distribution of ink jet heads, and hence manufacturing and packing steps of the ink jet heads can be simplified. Further, the inconvenience such as the formation of non-discharge nozzles caused by excess adhesion of a head cap or an adhesive of a face surface tape can be prevented. Further, the filling liquid for distribution of the present invention can be also preferably used for distribution of ink jet heads under the condition that ink tanks are separated therefrom and distribution of ink jet heads under the condition that the ink jet heads are mounted on an ink jet recording device, in which sealability is difficult to ensure and an aqueous medium is liable to be volatilized, compared to the case where ink jet heads are distributed alone.

In the distribution method of the present invention, it is preferred that a nozzle flow path be filled with a filling liquid for distribution having a viscosity of 1.3 mPa·s or more and 5.0 mPa·s or less, a print test be performed with the filling liquid for distribution, and then an ink jet head be distributed while the nozzle flow path is filled with the filling liquid for distribution. When a filling liquid for distribution having a viscosity of 1.3 mPa·s or more is used, the occurrence of satellites and mist can be suppressed during a print test, and an appropriate print test can be performed. On the other hand, when a filling liquid for distribution having a viscosity of 5.0 mPa·s or less is used, refilling of ink (supply of ink) to a recording head can be performed rapidly during a print test, and the occurrence of a rubbed image can be prevented. In order to produce the above-mentioned effects more reliably, the viscosity is more preferably 1.5 mPa·s or more and 3.5 mPa·s or less, particularly preferably 1.7 mPa·s or more and 3.2 mPa·s or less.

Figure 4:
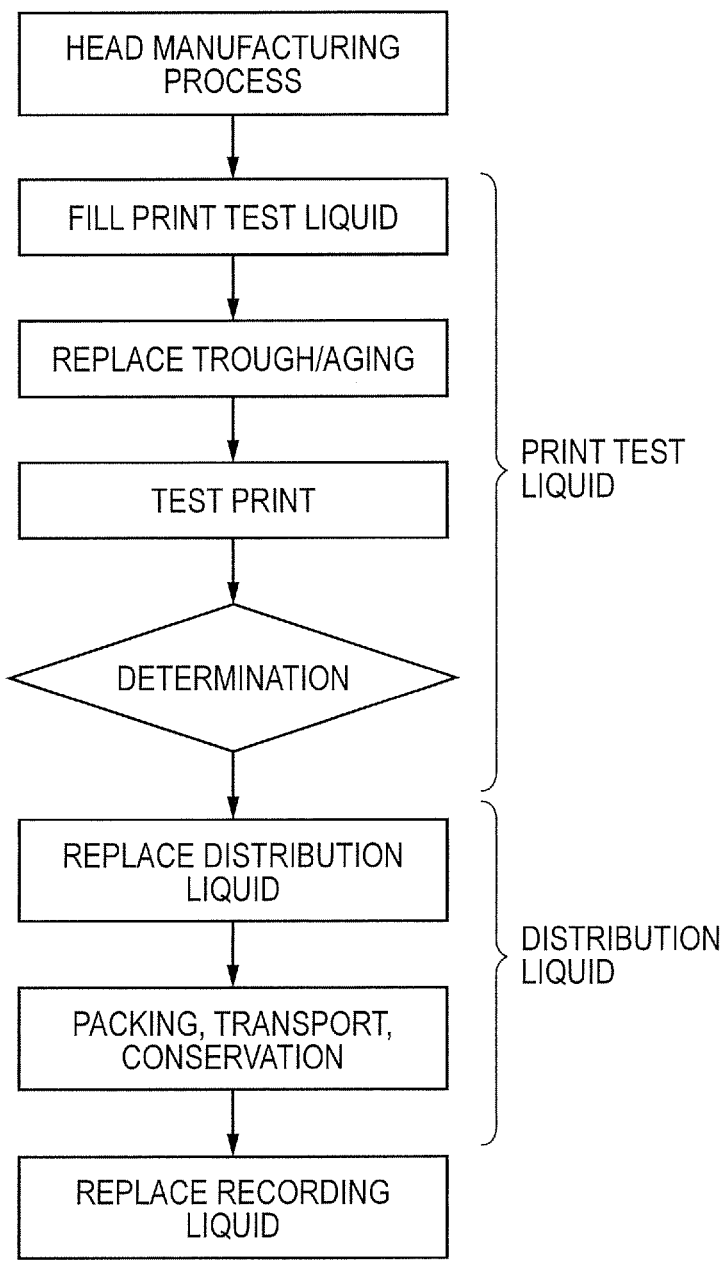
FIG. 4 is a process diagram illustrating a flow of a print test of an ink jet head in the related art.
Figure 5:
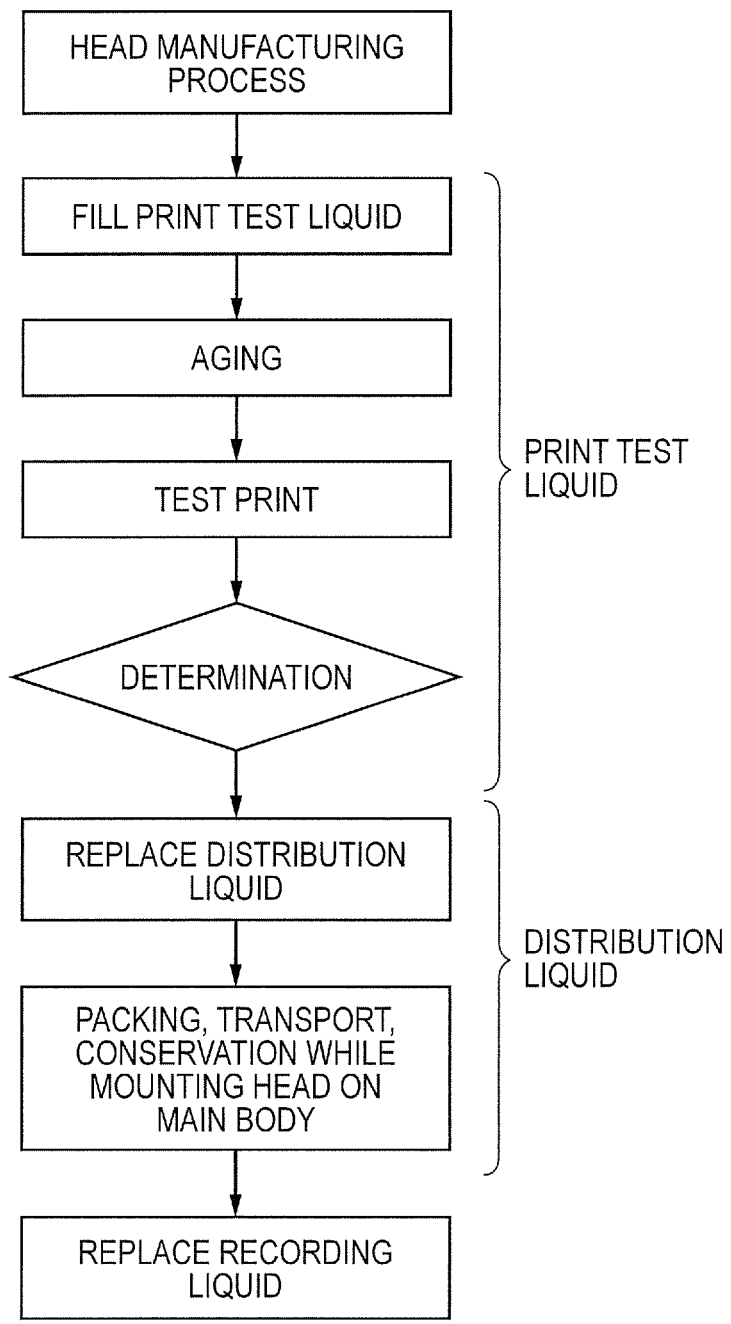
FIG. 5 is a process diagram illustrating a flow of a print test of the ink jet head of the present invention.

A print test can be performed with a filling liquid for distribution by using a filling liquid for distribution containing a predetermined amount of a dye and having the above-mentioned viscosity. Hitherto, as illustrated in a process diagram of FIG. 4, after a head manufacturing process, a nozzle flow path is filled with a print test liquid, and test print and determination are performed. Then, the print test liquid is replaced by a filling liquid for distribution, and the distribution such as packing, transport, and conservation of the head is performed. Then, the head is mounted on a main body of a recording device. The reason for this is that, when the head is distributed while being mounted on the recording device, the sealability is difficult to ensure and an aqueous medium is liable to be volatilized. However, in the distribution method using the filling liquid for distribution of the present invention, as illustrated in a process diagram of FIG. 5, after test print and determination are performed, distribution such as packing, transport, and conservation can also be performed while the head filled with the filling liquid for distribution is mounted on a main body of a recording device. Further, as illustrated in a process diagram of FIG. 6, the following may be performed: after a head manufacturing process, a nozzle flow path is filled with a filling liquid for distribution, test print and determination are performed, and thereafter the head is subjected to distribution such as packing, transport, and conservation. According to this method, the step of replacing a test ink by a filling liquid for distribution can be omitted, and the step can also be simplified. Further, according to this method, a waste liquid of a print test liquid is not generated.

EXAMPLES

Hereinafter, the present invention is more specifically described in detail by way of Examples and Comparative Examples. However, the present invention is not limited to only the constitutions of Examples below. It should be noted that "part(s)" and "%" in the following description refer to "part(s) by mass" and "mass %", respectively, unless otherwise stated.

(Measurement of Saturation Solubility)

First, each of dyes used in Examples and Comparative Examples was measured for saturation solubility (25° C.) with respect to a water-soluble compound. The following was used as the dye: C.I. Food Black 2 (FB-2); C.I. Direct Blue 199 (DBL199); or C.I. Direct Yellow 86 (DY86). The following was used as the water-soluble compound: glycerin (GLY); triethylene glycol (TEG); diethylene glycol (DEG); a mixed liquid of GLY and TEG (1:1); a mixed liquid of GLY, TEG, ethylene urea (EtU) (10:10:1); or a mixed liquid of GLY, TEG, and trimethylolpropane (TMP) (10:10:1). It should be noted that the mixed liquid of GLY, TEG, and EtU (10:10:1) and the mixed liquid of GLY, TEG, and TMP (10:10:1) were prepared by mixing EtU and TMP at a ratio of 0.1 with respect to the mixed liquid of GLY and TEG (1:1), respectively.

The saturation solubility was determined by gradually changing the amount of a dye to be added with respect to 100 g of a water-soluble compound at 25° C. to prepare dye solutions having different concentrations, measuring the respective dye solutions for absorbance, filtering the dye solutions with a membrane filter having a pore diameter of 1 μm, measuring the dye solutions for absorbance again, and obtaining the dye concentration of the dye solution showing a difference in absorbance before and after the filtration. Table 1 shows the results.

TABLE 1

| Dye Kind | Water-soluble organic compound Kind | Saturation solubility (g/100 g) |
|---|---|---|
| FB-2 | GLY | 4 |
|  | TEG | >10 |
|  | DEG | >10 |
|  | GLY:TEG (1:1) | >10 |
| DBL199 | GLY | >10 |
| DY86 | GLY | >10 |
|  | GLY:TEG:EtU (10:10:1) | >10 |
|  | GLY:TEG:TMP (10:10:1) | >10 |

Examples and Comparative Examples will be described with reference to Table 2.

Example 1

C.I Food Black 2 (FB-2) was used as a dye. Glycerin was used as a water-soluble organic compound. POE (10) acetylene glycol ("Acetylenol E100" manufactured by Kawaken Fine Chemicals Co., Ltd.) was used as a nonionic surfactant. Ion-exchanged water was added to FB-2 (0.2 part by mass), glycerin (20 parts by mass), and the nonionic surfactant (0.5 part by mass) so as to obtain 100 parts by mass in total. The composition thus obtained was stirred for 2 hours, and then, the composition was filtered with a membrane filter having a pore diameter of 1 μm. The filtrate was passed through an ion exchange resin layer to remove impurities such as calcium, to thereby obtain a filling liquid for distribution of Example 1.

Example 2

A filling liquid for distribution of Example 2 was obtained in the same way as in Example 1 except for changing the addition amount of FB-2 to 0.4 part by mass.

Example 3

A filling liquid for distribution of Example 3 was obtained in the same way as in Example 1 except for changing the addition amount of FB-2 to 0.5 part by mass.

Example 4

A filling liquid for distribution of Example 4 was obtained in the same way as in Example 1 except for changing the addition amount of FB-2 to 0.8 part by mass.

Example 5

A filling liquid for distribution of Example 5 was obtained in the same way as in Example 1 except for changing the addition amount of FB-2 to 0.8 part by mass and changing the addition amount of the water-soluble organic compound to 40 parts by mass.

Example 6

A filling liquid for distribution of Example 6 was obtained in the same way as in Example 3 except for changing the water-soluble organic compound from glycerin to triethylene glycol.

Example 7

A filling liquid for distribution of Example 7 was obtained in the same way as in Example 3 except for changing the water-soluble organic compound from glycerin to diethylene glycol.

Example 8

A filling liquid for distribution of Example 8 was obtained in the same way as in Example 3 except for changing the water-soluble organic compound from glycerin to a mixed liquid of glycerin and triethylene glycol (1:1).

Example 9

A filling liquid for distribution of Example 9 was obtained in the same way as in Example 3 except for changing the dye from FB-2 to C.I. Direct Yellow 86 (DY86) and changing the water-soluble compound from glycerin to a mixed liquid of glycerin, triethylene glycol, and ethylene urea (10:10:1).

Example 10

A filling liquid for distribution of Example 10 was obtained in the same way as in Example 3 except for changing the dye from FB-2 to DY86 and changing the water-soluble compound from glycerin to a mixed liquid of glycerin, triethylene glycol, and trimethylolpropane (10:10:1).

Example 11

A filling liquid for distribution of Example 11 was obtained in the same way as in Example 3 except for changing the dye from FB-2 to C.I. Direct Blue 199 (DBL199).

Example 12

A filling liquid for distribution of Example 12 was obtained in the same way as in Example 3 except for changing the dye from FB-2 to DY86.

Example 13

A filling liquid for distribution of Example 13 was obtained in the same way as in Example 11 except for changing the addition amount of the nonionic surfactant to 1 part by mass.

Example 14

A filling liquid for distribution of Example 14 was obtained in the same way as in Example 11 except for changing the addition amount of the nonionic surfactant to 0.3 part by mass.

Comparative Example 1

A filling liquid for distribution of Comparative Example 1 was obtained in the same way as in Example 1 except for changing the addition amount of FB-2 to 0.1 part by mass.

Comparative Example 2

A filling liquid for distribution of Comparative Example 2 was obtained in the same way as in Example 1 except for changing the addition amount of FB-2 to 1.5 parts by mass and changing the addition amount of glycerin to 40 parts by mass.

Comparative Example 3

A filling liquid for distribution of Comparative Example 3 was obtained in the same way as in Example 3 except for changing the addition amount of glycerin to 10 parts by mass.

Comparative Example 4

A filling liquid for distribution of Comparative Example 4 was obtained in the same way as in Example 3 except for changing the addition amount of the nonionic surfactant to 0.1 part by mass.

Comparative Example 5

A filling liquid for distribution of Comparative Example 5 was obtained in the same way as in Example 3 except for changing the surfactant from the nonionic surfactant to a fluorine-based amphoteric surfactant ("Surflon S231" manufactured by AGC Seimi Chemical Co., Ltd.).

Comparative Example 6

In Comparative Example 6, the filling liquid for distribution of Example 3 was used. It should be noted that a water-repellent head was used as an ink jet head in the following study.

(Manufacturing of Ink Jet Head)

An ink jet head having a nozzle structure illustrated in FIGS. 1A to 1C and having the entire structure illustrated in FIGS. 2A to 2C was manufactured. The opening area of an ink discharge port was set to 225 μm², and a nozzle row was formed of 4,800 nozzles. The length of the nozzle row was set to 4 inches. The resolution of the ink jet head was set to 1,200 dpi. A hydrophilic region was formed over the entire face surface. As illustrated in FIG. 1C, on the face surface, a top board member 161 and a bottom board portion 163 made of Si, and a nozzle top board 162, a nozzle bottom board 164, and a nozzle wall 153 made of an epoxy-based photosensitive resin are exposed. The face surface formed of end faces of those members was made hydrophilic by UV/O₃ treatment to form a hydrophilic region. The contact angle between the hydrophilic region and the filling liquid for distribution of Example 1 was 45° (hereinafter the obtained ink jet head is sometimes referred to as "hydrophilic head").

An ink jet head provided with a water-repellent region in place of a hydrophilic region was manufactured through use of an ink jet head having the same structure as that of the above-mentioned ink jet head. The water-repellent region was also formed on the entire face surface. Specifically, the face surface formed of end faces of the top board member 161, the bottom board portion 163, the nozzle top board 162, the nozzle bottom board 164, and the nozzle wall 153 as illustrated in FIG. 1C was made water-repellent by applying a water-repellent surface treatment agent ("KP-801M" manufactured by Shin-Etsu Chemical Co., Ltd.) onto the face surface, thereby forming a water-repellent region. The contact angle between the water-repellent region and water was 103.3° (hereinafter the obtained ink jet head is sometimes referred to as "water-repellent head").

(Filling of Filling Liquid for Distribution)

Each filling liquid for distribution of Examples and Comparative Examples was injected into an ink tank. The ink tank was connected to a recording device 100 (ink jet printer "LX-P5500" manufactured by Canon Finetech. Inc.) illustrated in FIG. 3, and a nozzle flow path of an ink jet head was filled with the filling liquid for distribution by a suction operation. In Examples 1 to 14 and Comparative Examples 1 to 5, the hydrophilic head was used. In Comparative Example 6, the water-repellent head was used, and a filling liquid for distribution having the same composition as that of Example 3 was used.

(Feasibility of Print Test with Filling Liquid for Distribution)

Subsequently after the nozzle flow path was filled with the filling liquid for distribution, 300,000 heat pulses were continuously applied to a heater of the ink jet head with the recording device 100 to print a nozzle check pattern with the filling liquid for distribution. Thus, a print test was performed.

The nozzle check pattern was formed as follows. Of the total of 4,800 nozzles of the ink jet head, first, a first nozzle and every sixteen nozzles from the first nozzle (1/75 inch interval, 300 nozzles in total) were each caused to draw a straight line with a length of 1.5 mm (first row), and then, a second nozzle and every sixteen nozzles from the second nozzle (1/75 inch interval, 300 nozzles in total) were each caused to draw a straight line with a length of 1.5 mm (second row). This operation was repeated 16 times in total (third row to 16th row) to obtain a stepped pattern having 16 rows each including 300 lines, i.e., 4,800 straight lines in total. The evaluation was made based on the number of non-discharge nozzles in the 4,800 nozzles. The number of non-discharge nozzles was counted basically by visually inspecting the printed pattern. It should be noted that, in Example 9 and the like using DY86, which is difficult to visually recognize, as a dye, the printed pattern was visually inspected under the condition that the printed pattern was irradiated with light from an LED lamp. It should be noted that the ink replaceability and image quality after ink replacement shown below were evaluated through use of an ink jet head having no non-discharge nozzles during a print test.

o: There are no non-discharge nozzles.

Δ: There are one or two non-discharge nozzles.

x: There are three or more non-discharge nozzles or there are adjacent non-discharge nozzles.

(Ink Replaceability)

After the print test with the filling liquid for distribution, the ink jet head was taken out from the recording device and packed in an aluminum package. The package was conserved under the condition of 60° C. for 2 weeks. After the conservation, it was confirmed that there was no fixation of ink at an ink discharge port of the ink jet head. Then, the ink jet head was connected to the recording device provided with an ink tank to which a recording liquid was injected, and the filling liquid for distribution in a nozzle flow path of the ink jet head was replaced by the recording liquid by a suction operation. As the recording liquid, Bk ink (Bk ink for LX-P5500 "BJ-P521Y" manufactured by Canon Finetech Inc.) for the recording device was used.

Ink replacement was performed by a recovery sequence (Recovery (Large)) mounted on the recording device, and thereafter, a print test was performed in the same way as in the filling liquid for distribution. The recovery sequence was repeated until mixed color was eliminated in the filling liquid for distribution in the print test, and the ink replacement was regarded as being completed when the mixed color was not recognized. The evaluation criteria were as follows. When the following evaluation is expressed by Symbol "o" or "Δ", it can be evaluated that neither thickening nor fixation of ink occurred.

o: Ink replacement is completed when the recovery sequence is performed once.

Δ: Ink replacement is completed when the recovery sequence is performed twice.

x: Ink replacement is not completed even when the recovery sequence is performed twice.

(Image Quality after Ink Replacement)

After the ink replacement was completed, a print test was performed by the same method as that of the filling liquid for distribution through use of photo paper ("PR-101" manufactured by Canon Inc.) for an ink jet printer as a recording medium. The evaluation criteria were as follows.

oo: Neither "misdirection print" nor non-discharge nozzles are recognized.

o: Neither adjacent "misdirection print" nor non-discharge nozzles are recognized, but there are 1 to 3 "misdirection print".

Δ: Neither adjacent "misdirection print" nor non-discharge nozzles are recognized, but there are 4 or 5 "misdirection print".

x: There are adjacent "misdirection print" or non-discharge nozzles, or there are 6 or more "misdirection print".

TABLE 2

| | Dye | | | Water-soluble organic compound | | | | | Surfactant | | | Surface |
| | | | With respect to water-soluble organic compound | Water-soluble organic solvent | | | Solid | | | | | |
| | Kind | Content (mass %) | Content (mass %) | Saturation solubility or less | GLY | TEG | DEG | EtU | TMP | Kind | Content (mass %) | Viscosity (mPa·s) | tension (mN/m) |
|---|---|---|---|---|---|---|---|---|---|---|---|---|---|
| Example 1 | FB-2 | 0.2 | 1.0 | o | 20 | — | — | — | — | Nonionic | 0.5 | 1.7 | 30.5 |
| Example 2 | FB-2 | 0.4 | 2.0 | o | 20 | — | — | — | — | Nonionic | 0.5 | 1.7 | 30.2 |
| Example 3 | FB-2 | 0.5 | 2.5 | o | 20 | — | — | — | — | Nonionic | 0.5 | 1.8 | 29.6 |
| Example 4 | FB-2 | 0.8 | 4.0 | o | 20 | — | — | — | — | Nonionic | 0.5 | 2 | 31.2 |
| Example 5 | FB-2 | 0.8 | 2.0 | o | 40 | — | — | — | — | Nonionic | 0.5 | 3.2 | 31.2 |
| Example 6 | FB-2 | 0.5 | 2.5 | o | — | 20 | — | — | — | Nonionic | 0.5 | 2 | 29.8 |
| Example 7 | FB-2 | 0.5 | 2.5 | o | — | — | 20 | — | — | Nonionic | 0.5 | 1.8 | 30.2 |
| Example 8 | FB-2 | 0.5 | 2.5 | o | 10 | 10 | — | — | — | Nonionic | 0.5 | 1.9 | 30.4 |
| Example 9 | DY86 | 0.5 | 2.4 | o | 10 | 10 | — | 1 | — | Nonionic | 0.5 | 2 | 31.2 |
| Example 10 | DY86 | 0.5 | 2.4 | o | 10 | 10 | — | — | 1 | Nonionic | 0.5 | 2 | 31.3 |
| Example 11 | DBL199 | 0.5 | 2.5 | o | 20 | — | — | — | — | Nonionic | 0.5 | 1.7 | 31.2 |
| Example 12 | DY86 | 0.5 | 2.5 | o | 20 | — | — | — | — | Nonionic | 0.5 | 1.7 | 30.8 |
| Example 13 | DBL199 | 0.5 | 2.5 | o | 20 | — | — | — | — | Nonionic | 1 | 1.7 | 26.5 |
| Example 14 | DBL199 | 0.5 | 2.5 | o | 20 | — | — | — | — | Nonionic | 0.3 | 1.8 | 33.8 |
| Comparative Example 1 | FB-2 | 0.1 | 0.5 | o | 20 | — | — | — | — | Nonionic | 0.5 | 1.7 | 30.3 |
| Comparative Example 2 | FB-2 | 1.5 | 3.8 | o | 40 | — | — | — | — | Nonionic | 0.5 | 3.4 | 31.2 |
| Comparative Example 3 | FB-2 | 0.5 | 5 | x | 10 | — | — | — | — | Nonionic | 0.5 | 1.3 | 30.8 |
| Comparative Example 4 | FB-2 | 0.5 | 2.5 | o | 20 | — | — | — | — | Nonionic | 0.1 | 2.1 | 37.5 |
| Comparative Example 5 | FB-2 | 0.5 | 2.5 | o | 20 | — | — | — | — | Amphoteric | 0.5 | 2.1 | 24.2 |
| Comparative Example 6 | FB-2 | 0.5 | 2.5 | o | 20 | — | — | — | — | Nonionic | 0.5 | 1.8 | 29.6 |

TABLE 3

| | Head | | Evaluation | |
|---|---|---|---|---|
| | Kind | Contact angle (°) | Ink replaceability | Image quality after ink replacement |
| Example 1 | Hydrophilic | 45 | ⊙⊙ | Δ |
| Example 2 | Hydrophilic | 45 | ○ | ○ |
| Example 3 | Hydrophilic | 45 | ○ | ○ |
| Example 4 | Hydrophilic | 45 | Δ | ⊙⊙ |
| Example 5 | Hydrophilic | 45 | Δ | ○ |
| Example 6 | Hydrophilic | 45 | ○ | ○ |
| Example 7 | Hydrophilic | 45 | ○ | ○ |
| Example 8 | Hydrophilic | 45 | ○ | ○ |
| Example 9 | Hydrophilic | 45 | ⊙⊙ | ○ |
| Example 10 | Hydrophilic | 45 | ⊙⊙ | ○ |
| Example 11 | Hydrophilic | 45 | ○ | ○ |
| Example 12 | Hydrophilic | 45 | ⊙⊙ | ○ |
| Example 13 | Hydrophilic | 45 | ○ | ○ |
| Example 14 | Hydrophilic | 45 | ○ | ○ |
| Comparative Example 1 | Hydrophilic | 45 | ⊙⊙ | × |
| Comparative Example 2 | Hydrophilic | 45 | × | × |
| Comparative Example 3 | Hydrophilic | 45 | ○ | × |
| Comparative Example 4 | Hydrophilic | 45 | ○ | × |
| Comparative Example 5 | Hydrophilic | 45 | ○ | × |
| Comparative Example 6 | Water-repellent | 103.3 | ○ | × |

As shown in Table 3, Examples 1 to 14 using the filling liquid for distribution of the present invention showed satisfactory results in both the ink replaceability and the image quality after ink replacement.

On the other hand, in Comparative Example 1 using a filling liquid for distribution having a low content of a dye, the image quality after ink replacement was unsatisfactory. In Comparative Example 2 using a filling liquid for distribution having a high content of a dye, both the ink replaceability and the image quality after ink replacement were unsatisfactory. Further, in Comparative Example 3 using a filling liquid for distribution in which a dye was dissolved at a concentration equal to or more than the saturation solubility with respect to a water-soluble organic compound, Comparative Example 4 using a filling liquid for distribution having high surface tension, Comparative Example 5 using a filling liquid for distribution having low surface tension, and Comparative Example 6 using a head in which a water-repellent region was formed on the periphery of an ink discharge port, the image quality after ink replacement was unsatisfactory.

The filling liquid for distribution according to this embodiment can be used as a filling liquid for distribution for an ink jet head in which a hydrophilic region is formed on the periphery of an ink discharge port.

Second Embodiment

The present invention will be hereinafter described in detail. It should be noted that the present invention is not limited to the following embodiments and includes all the subject matters including the matters to define the present invention. It should be noted that the term "distribution" as used herein refers to a general distribution process of a product from a producer (manufacturer) to a consumer (user) and includes all the steps from the production of a product by a producer (manufacturer) to the start of the use of the product by a consumer (user), such as packing and conservation before and after transport, as well as transport.

[1] Filling Liquid for Distribution:

The term "filling liquid for distribution" refers to a liquid which is to fill a nozzle flow path communicating with an ink discharge port during distribution of a thermal ink jet head. The filling liquid for distribution is caused to fill the nozzle flow path by a producer (manufacturer) prior to distribution of the ink jet head. Then, the filling liquid for distribution is replaced by ink for printing (recording liquid) at a time of use of the ink jet head by a consumer (user) and discharged out of the ink jet head. The filling liquid for distribution of the present invention can be preferably used for an ink jet head in which an ink discharge port has a small aperture with an opening area of 100 to 350 μm$^2$ and a water-repellent head in which a water-repellent region is formed on the periphery of an ink discharge port.

The filling liquid for distribution of the present invention is obtained by dissolving a dye in an aqueous medium containing at least a water-soluble organic compound and water as constituents.

[1-1] Dye:

The filling liquid for distribution of the present invention contains a dye as a coloring material. When the filling liquid for distribution contains a predetermined amount of the dye, the degradation in water repellency caused by the adhesion of impurities contained in a trace amount in the aqueous medium (water, water-soluble organic compound, etc.), constituent materials for an ink jet head, and the like to a water-repellent region of the ink jet head can be effectively prevented. The reason for using the dye instead of a pigment as a coloring material is the following: unlike pigment particles, dye particles are unlikely to be sedimented to be fixed to an ink discharge port, and hence the dye does not easily cause inconveniences such as "misdirection print" and clogging of a nozzle (occurrence of a non-discharge nozzle) caused by the fixation of the particles. Further, when the filling liquid for distribution contains a predetermined amount of the dye, a print test can be performed with the filling liquid for distribution.

Although there is no particular limitation on a molecular structure and the like of the dye, it is preferred to use a water-soluble dye. For example, a yellow dye, a red dye, a violet dye, a blue dye, a black dye, and the like listed below can be preferably used. It should be noted that in order to use a yellow dye having low visibility in a print test, it is necessary to make the yellow dye visible by a method of, for example, coloring a recording medium for a print test with a blue dye in advance or irradiating a printed pattern formed of the yellow dye with light such as black light or LED light.

[1-1A] Yellow Dye:

Examples of the yellow dye may include C.I. Direct Yellow, C.I. Acid Yellow, C.I. Reactive Yellow, and C.I. Food Yellow. Specifically, the following dyes are preferably used:

(1) C.I. Direct Yellow 8, 11, 12, 27, 28, 33, 39, 44, 50, 58, 85, 86, 87, 88, 89, 98, 100, 110, 132, and 142;
(2) C.I. Acid Yellow 1, 3, 7, 11, 17, 23, 25, 29, 36, 38, 40, 42, 44, 76, 98, and 99;
(3) C.I. Reactive Yellow 2, 3, 17, 25, 37, and 42;
(4) C.I. Food Yellow 3; and the like.

[1-1B] Red Dye:

Examples of the red dye may include C.I. Direct Red, C.I. Acid Red, C.I. Reactive Red, and C.I. Food Red. Specifically, the following dyes are preferably used:

(1) C.I. Direct Red 2, 4, 9, 11, 20, 23, 24, 31, 39, 46, 62, 75, 79, 80, 83, 89, 95, 197, 201, 218, 220, 224, 225, 226, 227, 228, 229, and 230;

(2) C.I. Acid Red 6, 8, 9, 13, 14, 18, 26, 27, 32, 35, 37, 42, 51, 52, 80, 83, 87, 89, 92, 106, 114, 115, 133, 134, 145, 158, 198, 249, 265, and 289;

(3) C.I. Reactive Red 7, 12, 13, 15, 17, 20, 23, 24, 31, 42, 45, 46, and 59;

(4) C.I. Food Red 87, 92, and 94; and the like.

[1-1C] Violet Dye:

An example of the violet dye may be C.I. Direct Violet. Specifically, C.I. Direct Violet 107 and the like are preferably used.

[1-1D] Blue Dye:

Examples of the blue dye may include C.I. Direct Blue, C.I. Acid Blue, and C.I. Reactive Blue. Specifically, the following dyes are preferably used:

(1) C.I. Direct Blue 1, 15, 22, 25, 41, 76, 77, 80, 86, 87, 90, 98, 106, 108, 120, 158, 163, 168, 199, and 226;

(2) C.I. Acid Blue 1, 7, 9, 15, 22, 23, 25, 29, 40, 43, 59, 62, 74, 78, 80, 90, 100, 102, 104, 117, 127, 138, 158, and 161;

(3) C.I. Reactive Blue 4, 5, 7, 13, 14, 15, 18, 19, 21, 26, 27, 29, 32, 38, 40, 44, and 100; and the like.

[1-1E] Black Dye:

Examples of the black dye may include C.I. Direct Black, C.I. Acid Black, and C.I. Food Black. Specifically, the following dyes are preferably used:

(1) C.I. Direct Black 17, 19, 22, 31, 32, 51, 62, 71, 74, 112, 113, 154, 168, and 195;

(2) C.I. Acid Black 2, 48, 51, 52, 110, 115, and 156;

(3) C.I. Food Black 1 and 2; and the like.

The dye is contained in the filling liquid for distribution in a concentration of 0.2 mass % or more and 1 mass % or less with respect to the total mass of the filling liquid for distribution. When the concentration of the dye is set to 0.2 mass % or more, the degradation in water repellency caused by the adhesion of impurities contained in a trace amount in the aqueous medium (water, water-soluble organic compound, etc.), constituent materials for an ink jet head, and the like to a water-repellent region of the ink jet head can be effectively prevented. When the concentration of the dye is set to 1 mass % or less, the "misdirection print" and clogging of a nozzle (occurrence of a non-discharge nozzle) caused by the fixation of the dye to an ink discharge port can be effectively prevented. Further, ink contamination caused by color mixing during replacement of the filling liquid by ink for recording can be prevented. In order to produce the above-mentioned effects surely, it is preferred that the dye be contained in a concentration of 0.3 mass % or more and 0.8 mass % or less with respect to the total mass of the filling liquid for distribution.

It should be noted that in the case where a plurality of ink jet heads (for example, four colors of cyan, magenta, yellow, and black (CMYK)) are mounted on an ink jet recording device, it is preferred that filling liquids for distribution for all the ink jet heads have the same composition.

The dye is contained in the filling liquid for distribution in a concentration equal to or less than saturation solubility with respect to the water-soluble organic compound. When the concentration of the dye is set to the saturation solubility or less, even if volatile components (water, etc.) in the aqueous medium are volatilized, the dissolved state of the dye can be kept. Thus, the "misdirection print" and clogging of a nozzle (occurrence of a non-discharge nozzle) caused by the thickening or fixation of the dye to an ink discharge port can be effectively prevented. It should be noted that the term "saturation solubility" as used herein refers to a saturation solubility at 25° C.

The saturation solubility of the dye with respect to the water-soluble organic compound can be determined, for example, by gradually changing the amount of the dye to be added with respect to 100 g of the water-soluble compound at 25° C. to prepare dye solutions having different concentrations, measuring the respective dye solutions for absorbance, filtering the dye solutions with a membrane filter having a pore diameter of 1 µm, measuring the dye solutions for absorbance again, and determining the saturation solubility from the dye concentration of the dye solution whose absorbance varies before and after the filtration. For example, the saturation solubility of C.I. Food Black 2 (FB2) with respect to glycerin is 4 (g/100 g), the saturation solubility of C.I. Food Black 2 (FB2) with respect to diethylene glycol is 16 (g/100 g), and the saturation solubility of C.I. Food Black 2 (FB2) with respect to triethylene glycol is 21 (g/100 g).

[1-2] Aqueous Medium:

In the filling liquid for distribution of the present invention, the dye is dissolved in an aqueous medium containing at least a water-soluble organic compound and water as constituents.

[1-2A] Water-Soluble Organic Compound:

The term "water-soluble organic compound" as used herein refers to an organic compound which is freely miscible in water or which has a solubility (at 25° C.) of 20 g/100 g or more with respect to water. Further, in the present invention, it is preferred that the water-soluble organic compound be a water-soluble organic solvent having a vapor pressure of 3 Pa or less at 20° C., that is, a hardly volatile compound. By using such compound, even in the case where volatile components (water, etc.) in the aqueous medium are volatilized, the dissolved state of the dye can be kept, and the precipitation and solidification of the dye can be prevented. Further, it is preferred that the water-soluble organic compound exhibit solubility with respect to the dye.

The molecular structure and the like of the water-soluble compound are not particularly limited, and examples thereof may include water-soluble solvents such as a polyhydric alcohol, an ester, a lower alkoxy alcohol, an amine, an amide, and a heterocycle described below.

(1) Polyhydric Alcohol:

Diethylene glycol, triethylene glycol, tetraethylene glycol, polyethylene glycol, dipropylene glycol, tripropylene glycol, 1,3-propylene glycol, isopropylene glycol, polypropylene glycol, pentamethylene glycol, trimethylene glycol, butylene glycol, isobutylene glycol, thiodiglycol, 1,2-hexanediol, 2-ethyl-1,3-hexanediol, 1,2-pentanediol, 1,5-pentanediol, 2-methyl-2,4-pentanediol, 1,3-propanediol, 1,4-butanediol, 1,7-heptanediol, 1,8-octanediol, 2-butene-1,4-diol, glycerin, diglycerin, or the like.

(2) Ester:

γ-Butyrolactone, diacetin, triethyl phosphate, or the like.

(3) Lower Alkoxy Alcohol:

2-Methoxyethanol, 2-ethoxyethanol, or the like.

(4) Amine:

Ethanolamine, diethanolamine, triethanolamine, N-methyldiethanolamine, N-ethyldiethanolamine, triethylenetetramine, tetraethylenepentamine, pentamethyldiethylenetriamine, or the like.

(5) Amide:

Formamide, N,N-dimethylformamide, N-methylformamide, N,N-dimethylacetamide, or the like.

(6) Heterocycle:

2-Pyrrolidone, N-ethylpyrrolidone, N-methyl-2-pyrrolidone, cyclohexylpyrrolidone, morpholine, N-ethylmorpholine, 2-oxazolidone, 1,3-dimethyl-2-imidazolidinone, imidazole, methylimidazole, hydroxyimidazole, dimethylaminopyridine, 1,3-propanesultone, hydroxyethylpiperazine, piperazine, or the like.

Of those, as the water-soluble organic solvent having a vapor pressure of 3 Pa or less at 20° C., there may be given diethylene glycol (2.7 Pa), triethylene glycol (0.02 Pa), glycerin (<0.01 Pa), and the like. Of those, glycerin is particularly preferred.

As the water-soluble organic compound, a solution obtained by dissolving a water-soluble organic compound in a solid form at 20° C. in the water-soluble organic solvent can also be used besides the water-soluble organic solvent. The solution is preferably a solution in which 1 g or more of the water-soluble organic compound in a solid form are dissolved in 100 g of the water-soluble organic solvent at room temperature (20° C.), more preferably a solution in which 5 g or more of the water-soluble organic compound in a solid form are dissolved in 100 g of the water-soluble organic solvent at room temperature (20° C.). There is no particular limitation on a specific structure of the water-soluble organic compound in a solid form, and for example, there may be given: ureas such as urea and ethylene urea; polyhydric alcohols in a solid form at room temperature (20° C.) such as 1,6-hexanediol, inositol, and trimethylolpropane; and saccharides such as glucose and sorbitol. In particular, urea is preferred because urea is hardly volatilized and has high water solubility. As a water-soluble organic solvent for dissolving the water-soluble organic compound in a solid form, glycerin, triethylene glycol, tetraethylene glycol, or the like is preferred.

The concentration of the water-soluble organic compound with respect to the total mass of the filling liquid for distribution is preferably 40 mass % or less, more preferably 35 mass % or less. When the concentration is set to 40 mass % or less, the filling liquid for distribution is unlikely to remain in a nozzle flow path when the filling liquid for distribution is replaced by ink for printing, which can minimize the recovery operation for ink replacement. In order to produce the effect of adding the water-soluble organic compound, the concentration is preferably 15 mass % or more, more preferably 20 mass % or more. The water-soluble organic compound may be used alone or in combination of two or more kinds.

[1-2B] Water:

As water, it is preferred that ion-exchanged water be used. The content of the water is preferably 30 mass % or more and 90 mass % or less with respect to the total mass of the filling liquid for distribution. When the content of the water is set to 30 mass % or more, the dye and the water-soluble organic compound can be hydrated, and the dye and the water-soluble organic compound can be prevented from being flocculated during distribution. On the other hand, when the content of the water is set to 90 mass % or less, the amount of the water-soluble organic compound increases relatively, and even in the case where volatile components (water, etc.) in the aqueous medium are volatilized, the dissolved state of the dye can be kept and the precipitation and solidification of the dye can be prevented. In order to produce the above-mentioned effect more reliably, it is more preferred that the content of the water be set to 55 mass % or more and 85 mass % or less.

[1-2C] Surfactant:

It is preferred that the aqueous medium contain a surfactant. The surfactant has the effect of enhancing discharge stability of the filling liquid for distribution and the effect of adjusting surface tension and wettability of the filling liquid for distribution. Although the kind of the surfactant is not particularly limited, it is preferred to use a nonionic surfactant. In particular, a nonionic surfactant having high hydrophilicity with a hydrophile-lipophile balance (HLB) value of 10 or more is preferred. Specifically, it is preferred to use a polyoxyethylene alkyl ether, an ethylene oxide adduct of acetylene glycol, or the like.

In order to produce the effect of enhancing discharge stability, the content of the surfactant is set to preferably 0.1 mass % or more, more preferably 0.15 mass % or more with respect to the total mass of the filling liquid for distribution. On the other hand, in order to suppress an increase in viscosity and reduction in surface tension by excess addition of the surfactant, the content of the surfactant is set to preferably 2 mass % or less, more preferably 1 mass % or less, still more preferably 0.2 mass % or less, particularly preferably 0.18 mass % or less with respect to the total mass of the filling liquid for distribution.

(1-2D) Other Additive:

An additive other than the surfactant may be added in the aqueous medium depending on purposes. Examples of such additive may include an anti-foaming agent, an antiseptic, an anti-mold agent, a pH regulator, and an antioxidant.

[1-3] Surface Tension

The surface tension of the filling liquid for distribution is adjusted to 35 mN/m or more. When the surface tension is set to 35 mN/m or more, the water repellency of a water-repellent region formed on the periphery of an ink discharge port can be prevented from being degraded. Thus, when the filling liquid for distribution is replaced by a recording liquid and printing is performed, increases in printing kinds and satellites can be prevented. On the other hand, although the upper limit of the surface tension is not particularly limited, the upper limit is set to preferably 43 mN/m or less, more preferably 38 mN/m or less. With this, discharge can be prevented from becoming unstable. The surface tension changes depending on the kinds and addition amounts of an organic solvent and a dye, as well as the addition amount of a surfactant contained in the filling liquid for distribution and the kind of the surfactant.

The surface tension of the filling liquid for distribution refers to a value measured by a plate method using a platinum plate with an automatic surface tensiometer (for example, "CBVP-Z type" manufactured by Kyowa Interface Science Co., LTD.) under the conditions of a temperature of 25° C. and a humidity of 50%. The surface tension of the filling liquid for distribution can be adjusted by, for example, the addition amount of the surfactant, and the kind and content of the water-soluble organic solvent.

[1-4] Viscosity:

The viscosity of the filling liquid for distribution is preferably 1.3 mPa·s or more and 5.0 mPa·s or less. When the viscosity of the filling liquid for distribution is set in the above-mentioned range, a print test can be performed with the filling liquid for distribution. This will be described specifically in the section of a distribution method.

The viscosity of the filling liquid for distribution refers to a value measured with an E-type viscometer (for example, "RE-80L viscometer" (trade name) manufactured by Toki Sangyo Co., Ltd.) under the condition of a temperature of 25° C. according to JIS Z 8803. The viscosity of the filling liquid for distribution can be adjusted by, for example, the addition amount of the surfactant and the addition amount of the water-soluble organic compound.

[2] Ink Jet Head:

An ink jet head according to an embodiment of the present invention will be hereinafter described with reference to FIGS. 7A to 7C and FIGS. 8A to 8C. It should be noted that the ink jet head of the present invention is not limited to the configuration described below.

Figure 7A:
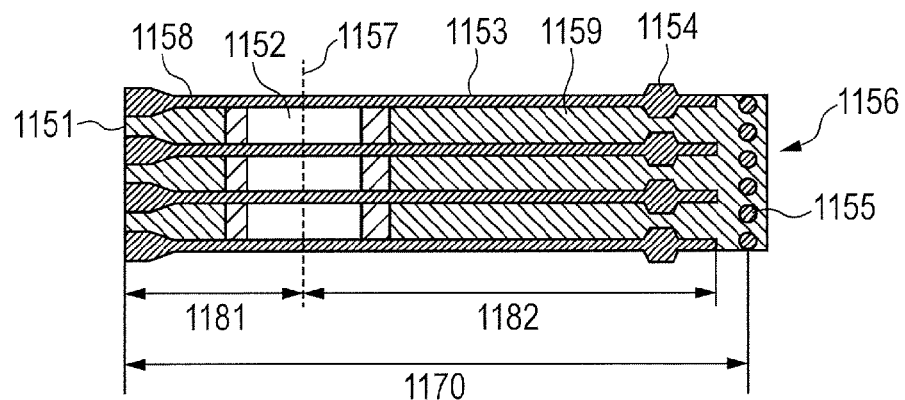
FIG. 7A is a top view schematically illustrating an internal structure of a nozzle of an ink jet head.
Figure 7B:
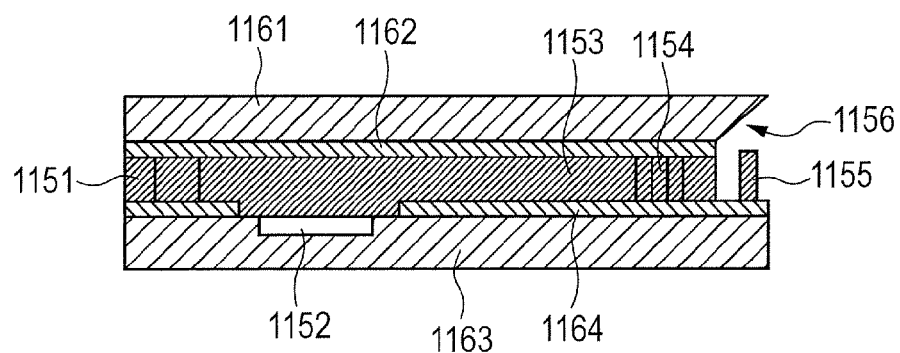
FIG. 7B is a side view schematically illustrating the internal structure of the nozzle illustrated in FIG. 7A.
Figure 7C:
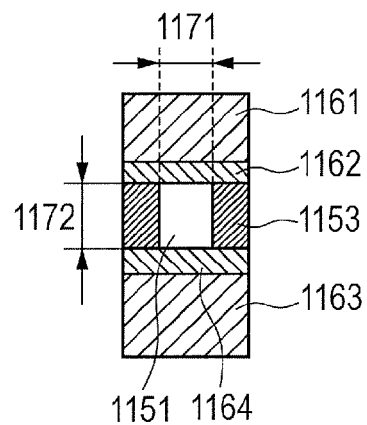
FIG. 7C is a front view schematically illustrating an ink discharge port of the nozzle illustrated in FIG. 7A.

[2-1] Structure of Nozzle Portion:

First, a structure of a nozzle portion will be described with reference to FIGS. 7A to 7C. FIG. 7A is a top view schematically illustrating an internal structure of a nozzle of an ink jet head. FIG. 7B is a side view schematically illustrating the internal structure of the nozzle illustrated in FIG. 7A. FIG. 7C is a front view schematically illustrating an ink discharge port of the nozzle illustrated in FIG. 7A.

The ink jet head of the present invention is a thermal ink jet head. In the thermal ink jet head, as illustrated in the figures, a plurality of nozzle flow paths 1159 partitioned by nozzle walls 1153 are formed, a plurality of ink discharge ports 1151 communicating with the nozzle flow paths 1159 are formed, and a heater 1152 is disposed in each of the nozzle flow paths 1159. In the illustrated embodiment, a nozzle filter 1155 configured to trap foreign matters floating in an ink flow path in the ink jet head is disposed between the nozzle flow paths 1159 and a common liquid chamber 1156. Further, a top board member 1161 to which a nozzle top board 1162 is attached includes an ink supply opening (not shown) formed by anisotropic etching or the like so as to allow outside ink to be introduced from the common liquid chamber 1156 to the nozzle flow paths 1159.

Right and left side surfaces of each nozzle flow path 1159 are partitioned by the nozzle walls 1153. In addition, an upper surface side of the nozzle flow path 1159 is partitioned by the nozzle top board 1162, and a bottom surface side thereof is partitioned by a nozzle bottom board 1164. That is, the nozzle flow path 1159 is an inner space having a substantially quadrangular prism shape partitioned from a surrounding space with the nozzle walls 1153, the nozzle top board 1162, and the nozzle bottom board 1164 being partition walls. The nozzle top board 1162 is stacked on the top board member 1161 formed of Si or the like, and the nozzle bottom board 1164 is stacked on a bottom board portion 1163.

The ink discharge port 1151 is an opening for discharging ink formed at one end of the nozzle flow path 1159 and communicates with the common liquid chamber 1156 via the nozzle flow path 1159. The ink discharge port 1151 is formed on a face surface. In the illustrated example, the face surface is formed integrally with the nozzle walls 1153, but may be formed by providing a face plate separately. The opening area of the ink discharge port 1151 is set to 100 to 350 $\mu m^2$. When the opening area is set to 100 $\mu m^2$ or more, the occurrence of a non-discharge nozzle can be prevented. On the other hand, when the opening area is set to 350 $\mu m^2$ or less, minute liquid droplets in which the amount of one droplet of ink is 10 pL or less can be formed, and a resolution of 600 dpi or more can be achieved. It should be noted that the opening area is represented by a product of a discharge port width 1171 and a discharge port height 1172.

A plurality of nozzle flow paths form a nozzle row. The number of nozzle flow paths forming a nozzle row is not particularly limited. However, in order to produce the effects of the present invention, it is preferred that the number of nozzle flow paths per inch be 600 to 2,400 and the length of the nozzle row be 2 inches or more.

The heater 1152 is a heating unit configured to generate bubbles in ink filling the nozzle flow path 1159 by heating. The heater 1152 is disposed on the bottom board portion 1163. As the heater 1152, a resistor (for example, a resistor made of tantalum nitride or the like) can be used. Electrodes (not shown) made of aluminum or the like for electric conduction are connected to the heater 1152, and a switching transistor (not shown) configured to control the electric conduction to the heater 1152 is connected to one of the electrodes. The drive of the switch transistor is controlled by an integrated circuit (IC) formed of a circuit such as a gate element for control, and the switch transistor is driven with a predetermined pattern by a signal from outside of the ink jet head.

It is preferred that the total length of a nozzle be set to 200 µm or more and 300 µm or less. The "total length of a nozzle" in this case refers to the length of the nozzle flow path 1159 and specifically refers to a length from an end on the ink discharge port 1151 side to an end on the common liquid chamber 1156 side of the nozzle wall 1153 forming the nozzle flow path 1159.

The nozzle flow path 1159 is divided into a nozzle front portion 1181 which is a portion from a heater center 1157 to the end on the ink discharge port 1151 side and a nozzle back portion 1182 which is a portion from the heater center 1157 to the end on the common liquid chamber 1156 side. From the viewpoint of a discharge speed, it is preferred that a flow resistance of the nozzle front portion 1181 (front resistance) and a flow resistance of the nozzle back portion 1182 (back resistance) satisfy a value of front resistance/back resistance of 0.3 to 0.8. It should be noted that a flow resistance can be determined by calculation according to the Hagen-Poiseuille law from values such as a flow path sectional area, flow path length, and viscosity of ink to be discharged. That is, if ink to be used (and its viscosity) is determined, the value of front resistance/back resistance can be adjusted by the flow path sectional area, flow path length, etc., of a nozzle.

[2-2] Water-Repellent Region:

In the ink jet head of the present invention, a water-repellent region is formed on the periphery of an ink discharge port. It is preferred that a water-repellent region having a contact angle of 90° or more with respect to water be formed on the periphery of the ink discharge port, and it is more preferred that a water-repellent region having a contact angle of 100° or more with respect to water be formed. The contact angle can be measured by an ATAN1/2θ method through use of a contact angle meter (for example, "SImage-mini" (trade name) manufactured by Excimer Inc.) according to JIS R 3257.

The water-repellent region can be formed by a method of providing a water-repellent film to the surface (face surface) of a member (face member) in which an ink discharge port is formed, or the like.

As the method of providing a water-repellent film to a face surface, there may be given a method of forming an ultra water-repellent resin film on a face surface. The ultra water-repellent resin film can be formed by a conventionally known method. For example, there may be given a method of forming a resin film by applying a fluorine resin, a silicone resin, or the like to a face surface and a method of forming a fluorine resin film by subjecting a fluorine-based monomer to plasma polymerization on a face surface. Further, a method of forming a water-repellent and oil-repellent resin film on a face surface may be adopted. For example, there may be given a method of forming a film made of a fluorine resin obtained by polymerizing a fluorocarbon compound. Of those, it is preferred to use a method of forming a water-repellent film by preparing a solution in which a fluorine-containing silicone coupling agent (for example, "KP-801M" manufactured by Shin-Etsu Chemical Co., Ltd.) is dissolved in a fluorine-based solvent ("CXT-809A manufactured by Asahi Glass Co., Ltd.; "<Novec> HFE-7100", <Novec> HFE-7200", "<Novec> HFE-71IPA", etc. manufactured by Sumitomo 3M Limited), and vapor-depositing the solution onto a face surface by heating.

[2-3] Nozzle Member:

The nozzle wall 1153, the nozzle top board 1162, and the nozzle bottom board 1164 partitioning the nozzle flow path 1159 can each be formed of, for example, a photosensitive resin. As the photosensitive resin, for example, there may be given a negative resist using a radical polymerization reaction and a negative resist using a cationic polymerization reaction.

The negative resist using a radical polymerization reaction is cured when polymerization and cross-linking proceed between molecules of a monomer or prepolymer which is radical-polymerizable contained in the resist through use of a radical generated from a photopolymerization initiator contained in the resist. Examples of the photopolymerization initiator may include a benzoin, a benzophenone, a thioxanthone, an anthraquinone, an acylphosphine oxide, a titanocene, and an acridine. The kind of the monomer or prepolymer is not particularly limited, and, for example, a monomer or prepolymer having the following group is preferred: an acryloyl group, a methacryloyl group, an acrylamide group, a maleic acid diester, or an allyl group.

The negative resist using a cationic polymerization reaction is cured when polymerization and cross-linking proceed between molecules of a monomer or prepolymer which is cationic-polymerizable contained in the resist through use of a cation generated from a photocationic initiator contained in the resist. Examples of the photocationic initiator may include an aromatic iodonium salt and an aromatic sulfonium salt. Specific examples thereof may include "ADEKA OPTOMER SP-170" and "SP-150" manufactured by ADEKA CORPORATION, "BBI-103" and "BBI-102" manufactured by Midori Kagaku Co., Ltd., "Rhodorsil Photoinitiator 2074" manufactured by Rhodia, and "IBPF", "IBCF", "TS-01", and "TS-91" manufactured by SANWA Chemical Co., Ltd. The kind of the monomer or prepolymer is not particularly limited, and, for example, a monomer or prepolymer having the following group is preferred: an epoxy group, a vinyl ether group, or an oxetane group. Specific examples thereof may include a bisphenol A-type epoxy resin, a novolac-type epoxy resin, and a bisphenol novolac-type epoxy resin. Specific examples thereof may include alicyclic epoxy resins such as "ARON OXETANE OXT-121" manufactured by TOAGOSEI CO., LTD., and "CELLOXIDE 2021", "GT-300 series", "GT-400 series", and "EHPE3150" manufactured by DAICEL CORPORATION.

In addition, the following may be used as the negative photoresist: "SU-8 series" and "KMPR-1000" manufactured by Kayaku MicroChem Corporation, "TMMR", "TMMR S2000", and "TMMF S2000" manufactured by TOKYO OHKA KOGYO CO., LTD., and the like.

In the present invention, an epoxy-based photosensitive resin excellent in solvent resistance and strength as a nozzle wall is preferably used. "TMMR 52000" manufactured by TOKYO OHKA KOGYO CO., LTD. is particularly preferred as a specific commercially available product.

Figure 8A:
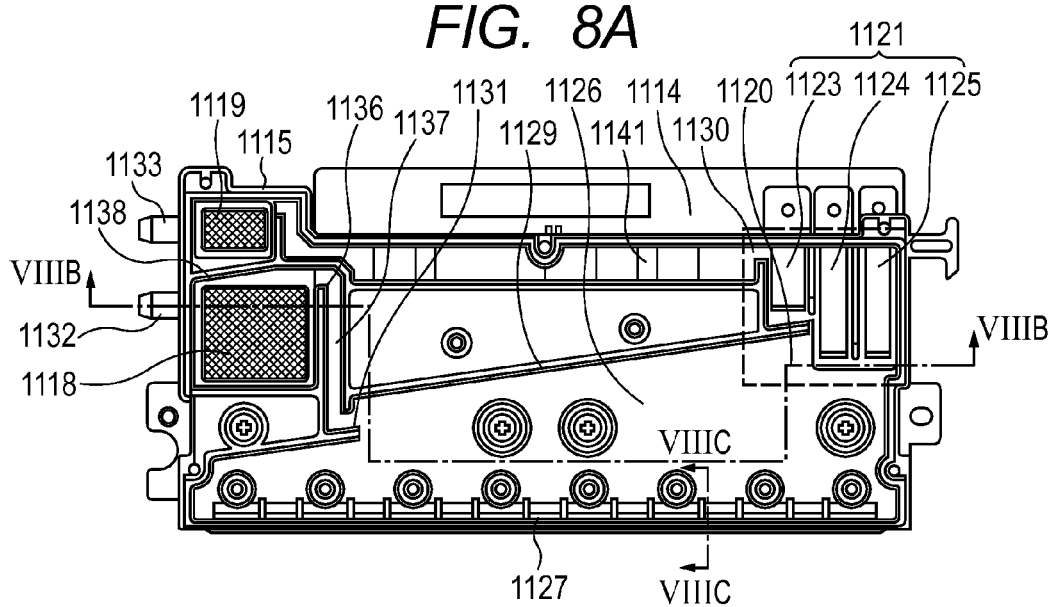
FIG. 8A is a front view schematically illustrating an ink jet head of the present invention.
Figure 8B:
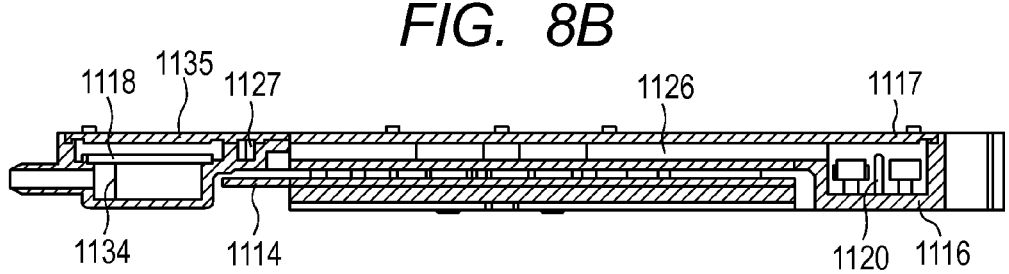
FIG. 8B is a sectional view of the ink jet head taken along line VIIIB-VIIIB of FIG. 8A.
Figure 8C:
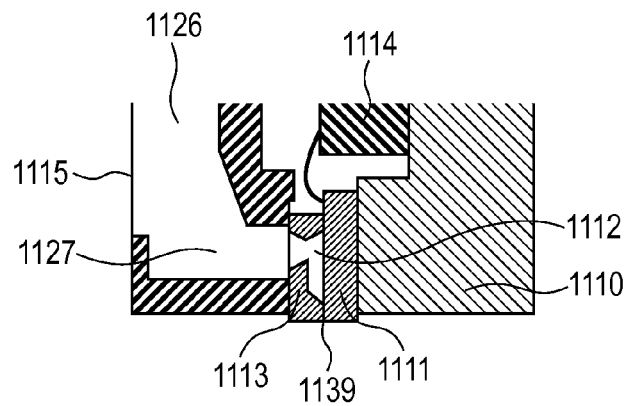
FIG. 8C is a sectional view of an ink jet head taken along line VIIIC-VIIIC of FIG. 8A.

[2-4] Entire Structure of Ink Jet Head:

Next, the entire structure of the ink jet head will be described with reference to FIGS. 8A to 8C. FIG. 8A is a front view illustrating a structure example of the ink jet head of the present invention. FIG. 8B is a sectional view taken along line VIIIB-VIIIB of FIG. 8A. FIG. 8C is a sectional view taken along line VIIIC-VIIIC of FIG. 8A. For convenience of the description, a liquid supply case cover is omitted in the front view.

As illustrated in the figures, the ink jet head preferably includes: a common liquid chamber 1112 communicating with a plurality of nozzle flow paths; an opening communicating with the common liquid chamber 1112; a main liquid supply chamber 1126 communicating with the opening; a liquid supply port 1127 communicating with the main liquid supply chamber 1126; a liquid supply chamber (a first liquid supply chamber 1134 and a second liquid supply chamber 1135) communicating with the liquid supply port 1127; a supply filter 1118 provided so as to separate the liquid supply chamber into the first liquid supply chamber 1134 and the second liquid supply chamber 1135 from an upstream side along a flow during liquid supply; a gas-liquid separation portion 1120 provided in part of the main liquid supply chamber 1126; and an air chamber 1141 communicating with the gas-liquid separation portion 1120.

Further, it is preferred that the nozzle flow paths, the common liquid chamber 1112, the opening, the main liquid supply chamber 1126, the liquid supply port 1127, the liquid supply chamber (first liquid supply chamber 1134 and second liquid supply chamber 1135), the supply filter 1118, the gas-liquid separation portion 1120, and the air chamber 1141 be disposed on a plane parallel to a plane including an arrangement direction of the nozzle flow paths and a discharge direction of the liquid, and the main liquid supply chamber 1126, the liquid supply port 1127, the supply filter 1118, the gas-liquid separation portion 1120, and the air chamber 1141 be disposed without being stacked on top of one another.

A base plate 1110 made of ceramic supports a heater substrate 1111 made of silicon. On the heater substrate 1111, a plurality of electrothermal converters (heaters or energy generation portions) serving as discharge energy generation elements for a liquid and a plurality of flow path walls forming nozzles corresponding to the electrothermal converters are formed. Further, a liquid chamber frame surrounding the common liquid chamber 1112 communicating with each nozzle is also formed on the heater substrate 1111. A top board 1113 forming the common liquid chamber 1112 is connected onto a side wall of the nozzle and the liquid chamber frame thus formed. Thus, the heater substrate 1111 and the top board 1113 are stacked so as to adhere to the base plate 1110 under the condition of being integrated with each other. Such lamination and adhesion are performed with an adhesive having a satisfactory heat conductivity such as silver paste. In a back portion of the heater substrate 1111 on the base plate 1110, a mounted printed circuit board (PCB) 1114 is supported through use of a double-sided tape (not shown). Each discharge energy generation element on the heater substrate 1111 and the PCB 1114 are electrically connected to each other by wire bonding corresponding to each wiring.

A liquid supply member 1115 is connected to an upper surface of the top board 1113. The liquid supply member 1115 is formed of a liquid supply case 1116 and a liquid supply case cover 1117. When the liquid supply case cover 1117 closes the upper surface of the liquid supply case 1116, a liquid chamber and a liquid supply path to be described later are formed. In this embodiment, the liquid supply case 1116 and the liquid supply case cover 1117 are connected to each other through use of a thermosetting adhesive. Further, the liquid supply case 1116 is provided with a supply filter 1118 and a discharge filter 1119. The supply filter 1118 serves to remove foreign matters in a liquid supplied to the liquid supply member 1115, and the discharge filter 1119 serves to prevent foreign matters from entering from outside of the liquid discharge head. Each filter is fixed to the liquid supply case 1116 by heat fusion. Further, the gas-liquid separation portion 1120 is formed in part of the liquid supply case 1116, and a liquid surface detection sensor 1121 is mounted from outside so as to protrude to the gas-liquid separation portion 1120. Thus, the amount of a liquid in the liquid chamber is controlled as described above.

Hereinafter, the configuration of the liquid chamber, the liquid supply path, and the like formed by fitting of two components: the liquid supply case 1116 and the liquid supply case cover 1117 will be described. In a connection surface of the liquid supply case 1116 with respect to the top board 1113, a rectangular opening (hereinafter referred to as "liquid supply port 1127") is formed substantially in parallel to an arrangement direction of nozzles over the width of the nozzle row, and the main liquid supply chamber 1126 in a reservoir chamber shape is formed in an extended portion of the liquid supply port 1127. That is, the main liquid supply chamber 1126 is formed substantially in parallel to the nozzle row over the width of the nozzle row. Further, a top surface on an opposed side of the liquid supply port 1127 forms a slope with the gas-liquid separation portion 1120 being an uppermost portion (hereinafter referred to as "main liquid supply chamber slope 1129") substantially over the entire region. The main liquid supply chamber slope 1129 has two openings, one of which is a liquid communication portion 1131 and the other of which is the gas-liquid separation portion 1120.

The gas-liquid separation portion 1120 forms part of the main liquid supply chamber 1126, and the depth of the part formed of the gas-liquid separation portion 1120 is larger than that of the other part of the main liquid supply chamber 1126. The purpose of this configuration is to enhance the effect of breaking air bubbles mixed in a liquid in the liquid chamber as described later. In the embodiment illustrated in FIG. 8A, three electrodes of stainless steel are mounted in the gas-liquid separation portion 1120, and the electrodes are an upper limit detection electrode 1123, a ground electrode 1124, and a lower limit detection electrode 1125 from the left side of FIG. 8A. The liquid surface in the main liquid supply chamber 1126 is kept between the upper limit and the lower limit by the electric conduction between the ground electrode 1124 and the upper limit detection electrode 1123 and the electric conduction between the ground electrode 1124 and the lower limit detection electrode 1125. In the ink jet head of the illustrated embodiment, the reliability of detection can be enhanced by detecting the liquid surface of a liquid subjected to gas-liquid separation.

An air communication portion 1130 is disposed on an extended portion of the gas-liquid separation portion 1120, and the air chamber 1141 serving as an air flow path is formed in a further extended portion. The discharge filter 1119 described above is provided in a still further extended portion and communicates with a discharge joint 1133. The discharge filter 1119 is formed of a material having water repellency. Even if a liquid flows into the air flow path (air chamber 1141) and ink adheres to the discharge filter 1119 to form a meniscus of the ink in the discharge filter 1119, the capillary force of a filter portion can be reduced by the water repellency and the ink can be removed easily.

On the other hand, the liquid supply port 1127 is provided through intermediation of the liquid communication portion 1131 provided at the main liquid supply chamber slope 1129. The liquid supply portion 1127 forms a tubular shape from the liquid communication portion 1131 to the vicinity of the supply filter 1118 and is formed on a plane which is substantially identical and parallel to that of the main liquid supply chamber 1126. The supply filter 1118 is also disposed on a plane which is substantially identical and parallel to the main liquid supply chamber 1126. The supply filter 1118 is provided so as to separate the liquid supply chamber into two chambers. The chamber on a side communicating with a supply joint 1132, that is, the chamber on an upstream side along a flow of liquid supply in the liquid discharge head is defined as the first liquid supply chamber 1134, and the chamber on a downstream side is defined as the second liquid supply chamber 1135. The supply filter 1118 is disposed on a plane which is substantially identical and parallel to that of the main liquid supply chamber 1126, and hence the first liquid supply chamber 1134 and the second liquid supply chamber 1135 adjacent to both surfaces of the supply filter 1118 are also disposed on a plane which is substantially parallel to that of the main liquid supply chamber 1126 and a nozzle arrangement surface 1139.

The second liquid supply chamber 1135 has an opening (hereinafter referred to as "second liquid supply chamber opening 1136") above the supply filter 1118 and communicates with the liquid supply port 1127 through the second liquid supply chamber opening 1136. Further, a top surface of the second liquid supply chamber 1135 is provided with a slope (hereinafter referred to as "second liquid supply chamber slope 1138") with the second liquid supply chamber opening 1136 being an uppermost portion.

As described above, the main liquid supply chamber 1126, the gas-liquid separation portion 1120, the liquid supply port 1127, the supply filter 1118, the first liquid supply chamber 1134, and the second liquid supply chamber 1135 are each provided on a plane which is substantially parallel to the nozzle arrangement surface 1139. On the other hand, as illustrated in the cross-section taken along line VIIIB-VIIIB, it is important that the main liquid supply chamber 1126, the liquid supply port 1127, the supply filter 1118, and the gas-liquid separation portion 1120 be disposed so as not to overlap each other in a direction perpendicular to the plane.

In the ink jet head of the present invention, an ink jet head and an ink tank may be configured integrally or may be configured so as to be separable from each other. An ink jet head of the type in which an ink jet head and an ink tank are configured so as to be separable from each other may be distributed while the ink tank is not mounted, and in this distribution form, the sealability of a nozzle flow path is difficult to ensure and the ink jet head is liable to be degraded. In the ink jet head of the present invention, the filling liquid for distribution of the present invention fills nozzle flow paths, and hence the inconvenience such as discharge defects can be effectively prevented.

[2-5] Filling of Filling Liquid for Distribution:

The nozzle flow path communicating with the ink discharge port is filled with the filling liquid for distribution of the present invention. It is preferred that, in a hollow area in the ink jet head, at least a portion from the ink discharge port to the common liquid chamber (that is, the nozzle flow path and the common liquid chamber) be filled with the filling liquid for distribution. As the filling method, for example, there may be given a method of injecting a filling liquid for distribution into an ink tank, connecting the ink tank to an ink jet recording device, and filling a nozzle flow path of an ink jet head with the filling liquid for distribution by a suction operation.

Figure 9:
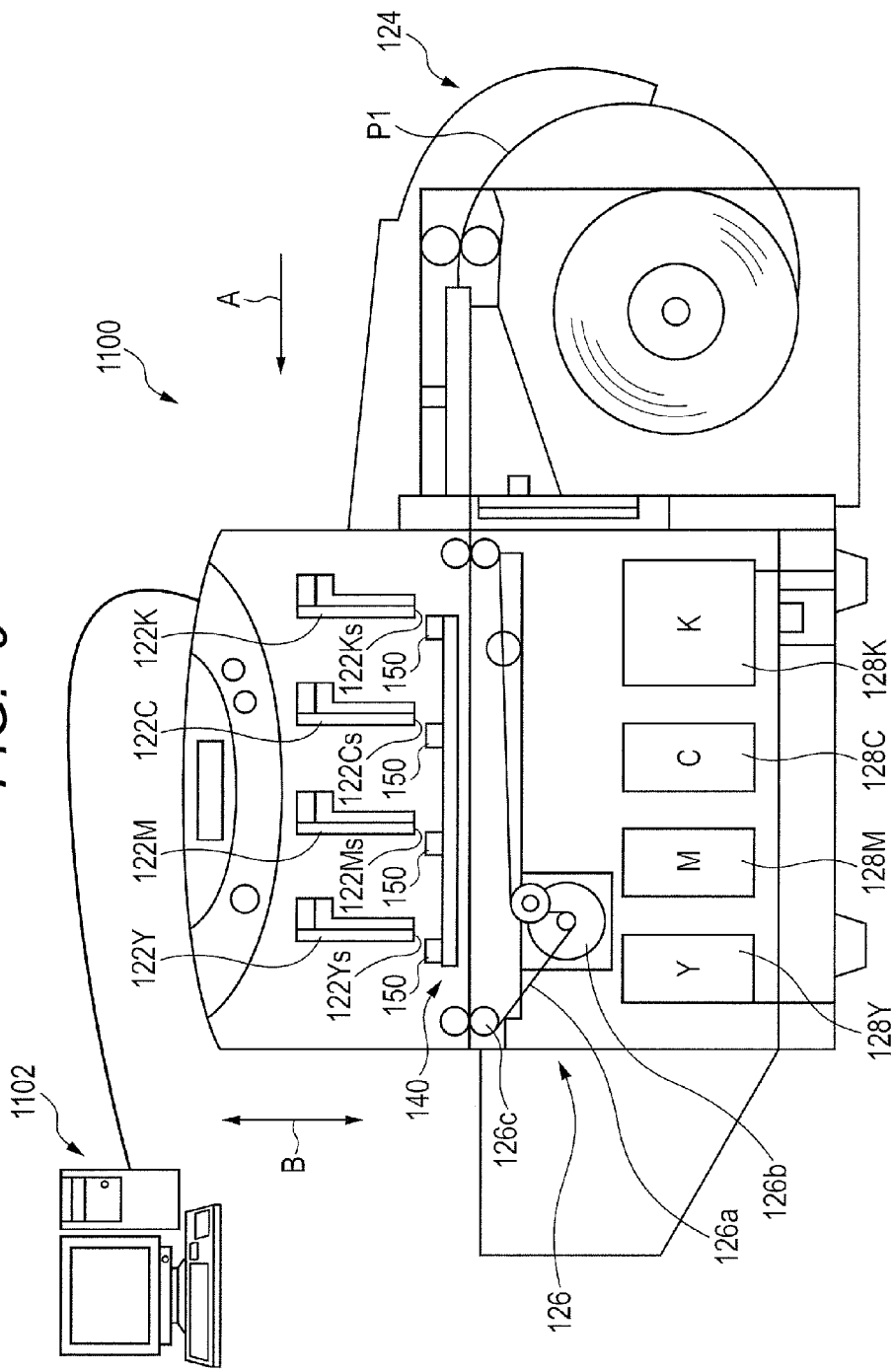
FIG. 9 is a front view schematically illustrating an entire configuration of an ink jet recording device.

[2-6] Ink Jet Recording Device:

Hereinafter, for reference, an ink jet recording device (hereinafter sometimes simply referred to as "recording device") to be used preferably for the ink jet head of the present invention will be described with reference to FIG. 9. FIG. 9 is a front view schematically illustrating the entire configuration of the ink jet recording device.

A recording device 1100 illustrated in the figure is an example of a recording device using long heads 122 extending over the entire region in a width direction of a recording region of a recording medium P1. The recording device 1100 is connected to a host personal computer (PC) 1102. The recording device 1100 performs recording by discharging a liquid to the recording medium P1 from four ink jet heads (hereinafter simply referred to as "heads 122K, 122C, 122M, 122Y") based on recording information sent from the host PC 1102. The recording medium P1 illustrated in the figure is roll paper. The four heads 122K, 122C, 122M, 122Y are arranged in a conveyance direction (direction indicated by the arrow A) of the recording medium P1. The heads 122K (for black ink), 122C (for cyan ink), 122M (for magenta ink), 122Y (for yellow ink) are arranged in parallel to each other in the conveyance direction in the stated order. The heads 122K, 122C, 122M, 122Y are so-called line heads in which nozzles are arranged at a predetermined density in a direction crossing (in the figure, direction orthogonal to) the conveyance direction of the recording medium P1. The arrangement width of the nozzles (arrangement range in the conveyance direction of the recording medium P1) is set to a width equal to or more than the maximum recording width of the recording medium P1 to be used. The recording device 1100 performs recording by driving a heater provided in each head 122 to discharge ink (recording liquid) from a nozzle without moving each head 122.

Along with the recording, foreign matters such as dust and ink droplets adhere to surfaces provided with ink discharge ports (face surfaces 122Ks, 122Cs, 122Ms, 122Ys) and the discharge state of each head 122 changes, which may influence the recording. Therefore, in order to enable the respective heads 122K, 122C, 122M, 122Y to discharge a liquid stably, a recovery unit 140 is incorporated in the recording device 1100. By cleaning the face surfaces 122Ks, 122Cs, 122Ms, 122Ys on a regular basis with the recovery unit 140, the liquid discharge state from the nozzles of the heads 122K, 122C, 122M, 122Y can be recovered to an initial satisfactory discharge state. The recovery unit 140 includes caps 150 to be used for removing a liquid and fine air bubbles from the face surfaces 122Ks, 122Cs, 122Ms, 122Ys of the four heads 122K, 122C, 122M, 122Y during a cleaning operation. The caps 150 are provided independently for the heads 122K, 122C, 122M, 122Y.

The recording medium P1 is supplied from a supply unit 124, and conveyed in the direction indicated by the arrow A by a conveyance mechanism 126 incorporated in the recording device 1100. The conveyance mechanism 126 includes a conveyance belt 126a configured to place the recording medium P1 thereon and conveying it, a conveyance motor 126b configured to rotate the conveyance belt 126a, a roller 126c configured to apply tension to the conveyance belt 126a, and the like. During recording, when the recording medium P1 reaches a position below the head 122K (for black ink) while being conveyed, black ink is discharged from the head 122K based on recording information sent from the host PC 1102. Similarly, ink of each color is discharged from the heads 122C, 122M, and 122Y in the stated order to complete color recording to the recording medium P1.

[3] Distribution Method

The distribution method of the present invention is a distribution method for a thermal ink jet head. The ink jet head of the present invention described above is used as the thermal ink jet head, and the ink jet head is distributed while nozzle flow paths communicating with ink discharge ports of the ink jet head are filled with the filling liquid for distribution of the present invention. The distribution method of the present invention includes both the form in which heads are distributed alone and the form in which the heads are distributed while being mounted on the ink jet recording device. As the form in which the heads are distributed while being mounted on the ink jet recording device, for example, there may be given the form in which capped heads are distributed while being mounted on a main body of an ink jet recording device.

Even when an aqueous medium is volatilized during distribution, the dissolved state of a dye can be kept by using the filling liquid for distribution of the present invention. Therefore, it is not necessary to seal, for example, ink discharge ports with head caps or face surface tapes at a time of distribution of ink jet heads, and hence manufacturing and packing steps of the ink jet heads can be simplified. Further, the inconvenience such as the formation of non-discharge nozzles caused by excess adhesion of a head cap or an adhesive of a face surface tape can be prevented. Further, the filling liquid for distribution of the present invention can be also preferably used for distribution of ink jet heads under the condition that ink tanks are separated therefrom and distribution of ink jet heads under the condition that the ink jet heads are mounted on an ink jet recording device, in which sealability is difficult to ensure and an aqueous medium is liable to be volatilized, compared to the case where ink jet heads are distributed alone.

In the distribution method of the present invention, it is preferred that a nozzle flow path be filled with a filling liquid for distribution having a viscosity of 1.3 mPa·s or more and 5.0 mPa·s or less, a print test be performed with the filling liquid for distribution, and then an ink jet head be distributed while the nozzle flow path is filled with the filling liquid for distribution. When a filling liquid for distribution having a viscosity of 1.3 mPa·s or more is used, the occurrence of satellites and mist can be suppressed during a print test, and an appropriate print test can be performed. On the other hand, when a filling liquid for distribution having a viscosity of 5.0 mPa·s or less is used, refilling of ink (supply of ink) to a recording head can be performed rapidly during a print test, and the occurrence of a rubbed image can be prevented. In order to produce the above-mentioned effects more reliably, the viscosity is more preferably 1.5 mPa·s or more and 3.5 mPa·s or less, particularly preferably 1.7 mPa·s or more and 3.2 mPa·s or less.

A print test can be performed with a filling liquid for distribution by using a filling liquid for distribution containing a predetermined amount of a dye and having the above-mentioned viscosity. Hitherto, as illustrated in a process diagram of FIG. 4, after a head manufacturing process, a nozzle flow path is filled with a print test liquid, and test print and determination are performed. Then, the print test liquid is replaced by a filling liquid for distribution, and the distribution such as packing, transport, and conservation of the head is performed. Then, the head is mounted on a main body of a recording device. The reason for this is that, when the head is distributed while being mounted on the recording device, the sealability is difficult to ensure and an aqueous medium is liable to be volatilized. However, in the distribution method using the filling liquid for distribution of the present invention, as illustrated in a process diagram of FIG. 5, after test print and determination are performed, distribution such as packing, transport, and conservation can also be performed while the head filled with the filling liquid for distribution is mounted on a main body of a recording device. Further, as illustrated in a process diagram of FIG. 6, the following may be performed: after a head manufacturing process, a nozzle flow path is filled with a filling liquid for distribution, test print and determination are performed, and thereafter the head is subjected to distribution such as packing, transport, and conservation. According to this method, the step of replacing a test ink by a filling liquid for distribution can be omitted, and the step can also be simplified. Further, according to this method, a waste liquid of a print test liquid is not generated.

EXAMPLES

Hereinafter, the present invention will be more specifically described by way of Examples and Comparative Examples. However, the present invention is not limited to only the constructions of Examples below. It should be noted that "part(s)" and "%" in the following description refer to "part(s) by mass" and "mass %", respectively, unless otherwise stated.

(Measurement of Saturation Solubility)

First, each of dyes used in Examples and Comparative Examples was measured for saturation solubility (25° C.) The following was used as the dye: C.I. Food Black 2 (FB-2); C.I. Direct Blue 199 (DBL199); or C.I. Direct Yellow 86 (DY86). The following was used as a water-soluble compound: glycerin (GLY); triethylene glycol (TEG); diethylene glycol (DEG); a mixed liquid of GLY and TEG (1:1); a mixed liquid of GLY, TEG, and ethylene urea (EtU) (10:10:1); or a mixed liquid of GLY, TEG, and trimethylolpropane (TMP) (10:10:1). It should be noted that the mixed liquid of GLY, TEG, and EtU (10:10:1) and the mixed liquid of GLY, TEG, TMP (10:10:1) were prepared by mixing EtU and TMP at a ratio of 0.1 with respect to the mixed liquid of GLY and TEG (1:1), respectively.

The saturation solubility was determined by gradually changing the amount of a dye to be added with respect to 100 g of a water-soluble compound at 25° C. to prepare dye solutions having different concentrations, measuring the respective dye solutions for absorbance, filtering the dye solutions with a membrane filter having a pore diameter of 1 μm, measuring the dye solutions for absorbance again, and obtaining the dye concentration of the dye solution showing a difference in absorbance before and after the filtration. Table 4 shows the results.

TABLE 4

| Dye Kind | Water-soluble organic compound Kind | Saturation solubility (g/100 g) |
|---|---|---|
| FB-2 | GLY | 4 |
|  | TEG | >10 |
|  | DEG | >10 |
|  | GLY:TEG (1:1) | >10 |
| DBL199 | GLY | >10 |

TABLE 4-continued

| Dye Kind | Water-soluble organic compound Kind | Saturation solubility (g/100 g) |
|---|---|---|
| DY86 | GLY | >10 |
|  | GLY:TEG:EtU (10:10:1) | >10 |
|  | GLY:TEG:TMP (10:10:1) | >10 |

Examples and Comparative Examples are described with reference to Table 5.

Example 15

C.I Food Black 2 (FB-2) was used as a dye. Glycerin was used as a water-soluble organic compound. POE (10) acetylene glycol ("Acetylenol E100" (trade name) manufactured by Kawaken Fine Chemicals Co., Ltd.) was used as a nonionic surfactant. Ion-exchanged water was added to FB-2 (0.2 part by mass), glycerin (20 parts by mass), and the nonionic surfactant (0.15 part by mass) so as to obtain 100 parts by mass in total. The composition thus obtained was stirred for 2 hours, and then, the composition was filtered with a membrane filter having a pore diameter of 1 μm. The filtrate was passed through an ion exchange resin layer to remove impurities such as calcium, to thereby obtain a filling liquid for distribution of Example 15.

Example 16

A filling liquid for distribution of Example 16 was obtained in the same way as in Example 15 except for changing the addition amount of FB-2 to 0.4 part by mass.

Example 17

A filling liquid for distribution of Example 17 was obtained in the same way as in Example 15 except for changing the addition amount of FB-2 to 0.5 part by mass.

Example 18

A filling liquid for distribution of Example 18 was obtained in the same way as in Example 15 except for changing the addition amount of FB-2 to 0.8 part by mass.

Example 19

A filling liquid for distribution of Example 19 was obtained in the same way as in Example 15 except for changing the addition amount of FB-2 to 0.8 part by mass and changing the addition amount of the water-soluble organic compound to 40 parts by mass.

Example 20

A filling liquid for distribution of Example 20 was obtained in the same way as in Example 17 except for changing the water-soluble organic compound from glycerin to triethylene glycol.

Example 21

A filling liquid for distribution of Example 21 was obtained in the same way as in Example 17 except for changing the water-soluble organic compound from glycerin to diethylene glycol.

Example 22

A filling liquid for distribution of Example 22 was obtained in the same way as in Example 17 except for changing the water-soluble organic compound from glycerin to a mixed liquid of glycerin and triethylene glycol (1:1).

Example 23

A filling liquid for distribution of Example 23 was obtained in the same way as in Example 17 except for changing the dye from FB-2 to C.I. Direct Yellow 86 (DY86) and changing the water-soluble compound from glycerin to a mixed liquid of glycerin, triethylene glycol, and ethylene urea (10:10:1).

Example 24

A filling liquid for distribution of Example 24 was obtained in the same way as in Example 17 except for changing the dye from FB-2 to DY86 and changing the water-soluble compound from glycerin to a mixed liquid of glycerin, triethylene glycol, and trimethylolpropane (10:10:1).

Example 25

A filling liquid for distribution of Example 25 was obtained in the same way as in Example 17 except for changing the dye from FB-2 to C.I. Direct Blue 199 (DBL199).

Example 26

A filling liquid for distribution of Example 26 was obtained in the same way as in Example 17 except for changing the dye from FB-2 to DY86.

Example 27

A filling liquid for distribution of Example 27 was obtained in the same way as in Example 25 except for changing the addition amount of the nonionic surfactant to 0.1 part by mass.

Example 28

A filling liquid for distribution of Example 28 was obtained in the same way as in Example 25 except for changing the addition amount of the nonionic surfactant to 0.18 part by mass.

Comparative Example 7

A filling liquid for distribution of Comparative Example 7 was obtained in the same way as in Example 15 except for changing the addition amount of FB-2 to 0.1 part by mass.

Comparative Example 8

A filling liquid for distribution of Comparative Example 8 was obtained in the same way as in Example 15 except for changing the addition amount of FB-2 to 1.5 parts by mass and changing the addition amount of glycerin to 40 parts by mass.

Comparative Example 9

A filling liquid for distribution of Comparative Example 9 was obtained in the same way as in Example 17 except for changing the addition amount of glycerin to 10 parts by mass.

Comparative Example 10

A filling liquid for distribution of Comparative Example 10 was obtained in the same way as in Example 17 except for changing the addition amount of the nonionic surfactant to 0.3 part by mass.

Comparative Example 11

In Comparative Example 11, a filling liquid for distribution having the same composition as that of Example 17 was prepared. It should be noted that a hydrophilic head was used as an ink jet head in the following study.

(Manufacturing of Ink Jet Head)

An ink jet head having a nozzle structure illustrated in FIGS. 7A to 7C and having the entire structure illustrated in FIGS. 8A to 8C was manufactured. The opening area of an ink discharge port was set to 225 $\mu m^2$, and a nozzle row was formed of 4,800 nozzles. The length of the nozzle row was set to 4 inches. The resolution of the ink jet head was set to 1,200 dpi. A water-repellent region was formed over the entire face surface. As illustrated in FIG. 7C, on the face surface, a top board member 1161 and a bottom board portion 1163 made of Si, and a nozzle top board 1162, a nozzle bottom board 1164, and a nozzle wall 1153 made of an epoxy-based photosensitive resin are exposed. That is, the face surface is formed of end faces of those members. A solution in which a fluorine-containing silicone coupling agent ("KP-801M" manufactured by Shin-Etsu Chemical Co., Ltd.) was dissolved in a fluorine-based solvent ("CXT-809A" manufactured by Asahi Glass Co., Ltd.) was prepared, and the entire face surface was made water-repellent by depositing the solution from the vapor onto the face surface by heating, thereby forming a water-repellent region. The contact angle of the water-repellent region with water was 103.3° (hereinafter the obtained ink jet head is sometimes referred to as "water-repellent head").

An ink jet head provided with a hydrophilic region in place of the water-repellent region was manufactured through use of an ink jet head having the same structure as that of the above-mentioned ink jet head. The hydrophilic region was formed on the entire face surface. Specifically, the face surface formed of end faces of the top board member 1161, the bottom board portion 1163, the nozzle top board 1162, the nozzle bottom board 1164, and the nozzle wall 1153 as illustrated in FIG. 7C was made hydrophilic by UV/O$_3$ treatment to form a hydrophilic region. The contact angle of the hydrophilic region with the distribution ink of Example 17 was 55° (hereinafter the obtained ink jet head is sometimes referred to as "hydrophilic head").

(Filling of Filling Liquid for Distribution)

Each filling liquid for distribution of Examples and Comparative Examples was injected into an ink tank. The ink tank was connected to a recording device 1100 (ink jet printer "LX-P5500" manufactured by Canon Finetech. Inc.) illustrated in FIG. 9, and a nozzle flow path of an ink jet head was filled with the filling liquid for distribution by a suction operation. In Examples 15 to 28 and Comparative Examples 7 to 10, the water-repellent head was used. In Compara- Example 11, the hydrophilic head was used, and a filling liquid for distribution having the same composition as that of Example 17 was used.

(Feasibility of Print Test with Filling Liquid for Distribution)

Subsequently after the nozzle flow path was filled with the filling liquid for distribution, 300,000 heat pulses were continuously applied to a heater of the ink jet head with the recording device 1100 to print a nozzle check pattern with the filling liquid for distribution. Thus, and thereby a print test was performed.

The nozzle check pattern was formed as follows. Of the total of 4,800 nozzles of the ink jet head, first, a first nozzle and every sixteen nozzles from the first nozzle (1/75 inch interval, 300 nozzles in total) were each caused to draw a straight line with a length of 1.5 mm (first row), and then, a second nozzle and every sixteen nozzles from the second nozzle (1/75 inch interval, 300 nozzles in total) were each caused to draw a straight line with a length of 1.5 mm (second row). This operation was repeated 16 times in total (third row to 16th row) to obtain a stepped pattern having 16 rows each including 300 lines, i.e., 4,800 straight lines in total. The evaluation was made based on the number of non-discharge nozzles in the 4,800 nozzles. The number of non-discharge nozzles was counted basically by visually inspecting the printed pattern. It should be noted that, in Example 23 using DY86, which is difficult to visually recognize, as the dye, the printed pattern was visually inspected under the condition that the printed pattern was irradiated with light from an LED lamp. It should be noted that the ink replaceability and image quality after ink replacement shown below were evaluated through use of an ink jet head having no non-discharge nozzles during a print test.

o: There are no non-discharge nozzles.

Δ: There are one or two non-discharge nozzles.

x: There are three or more non-discharge nozzles or there are adjacent non-discharge nozzles.

(Ink Replaceability)

After the print test with the filling liquid for distribution, the ink jet head was taken out from the recording device and packed in an aluminum package. The package was conserved under the condition of 60° C. for 2 weeks. After the conservation, it was confirmed that there was no fixation of ink at an ink discharge port of the ink jet head. Then, the ink jet head was connected to the recording device provided with an ink tank to which a recording liquid is injected, and the filling liquid for distribution in a nozzle flow path of the ink jet head was replaced by the recording liquid by a suction operation. As the recording liquid, Bk ink (Bk ink for LX-P5500 "BJI-P511Y" manufactured by Canon Finetech Inc.) for the recording device was used. The replacement by the recording liquid (ink replacement) was performed by a recovery sequence (Recovery (Large)) mounted on the recording device.

After the ink replacement, a print test was performed in the same way as in the filling liquid for distribution. The recovery sequence was repeated until mixed color was eliminated in the filling liquid for distribution in the print test, and the ink replacement was regarded as being completed when the mixed color was not recognized. The evaluation criteria were as follows. When the following evaluation is expressed by Symbol "o" or "Δ", it can be evaluated that neither thickening nor fixation of ink occurred.

o: Ink replacement is completed when the recovery sequence is performed once.

Δ: Ink replacement is completed when the recovery sequence is performed twice.

x: Ink replacement is not completed even when the recovery sequence is performed twice.

(Image Quality after Ink Replacement)

After the ink replacement was completed, a print test was performed by the same method as that of the filling liquid for distribution through use of photo paper ("PR-101" manufactured by Canon Inc.) for an ink jet printer as a recording medium. The evaluation criteria were as follows.

oo: Neither "misdirection print" nor non-discharge nozzles are recognized.

o: Neither adjacent "misdirection print" nor non-discharge nozzles are recognized, but there are 1 to 3 "misdirection print".

Δ: Neither adjacent "misdirection print" nor non-discharge nozzles are recognized, but there are 4 or 5 "misdirection print".

x: There are adjacent "misdirection print" or non-discharge nozzles, or there are 6 or more "misdirection print".

TABLE 5

| | Dye | | | Water-soluble organic compound | | | | | Surfactant | | Viscosity (mPa·s) | Surface tension (mN/m) |
| | | With respect to water-soluble organic compound | | Water-soluble organic solvent | | | Solid | | | | | |
| | Kind | Content (mass %) | Content (mass %) | saturation solubility or less | GLY | TEG | DEG | EtU | TMP | Kind | Content (mass %) | | |
| | | | | | (mass %) | | | | | | | | |
| Example 15 | FB-2 | 0.2 | 1.0 | o | 20 | — | — | — | — | Nonionic | 0.15 | 1.6 | 35.8 |
| Example 16 | FB-2 | 0.4 | 2.0 | o | 20 | — | — | — | — | Nonionic | 0.15 | 1.6 | 35.6 |
| Example 17 | FB-2 | 0.5 | 2.5 | o | 20 | — | — | — | — | Nonionic | 0.15 | 1.8 | 35.7 |
| Example 18 | FB-2 | 0.8 | 4.0 | o | 20 | — | — | — | — | Nonionic | 0.15 | 1.9 | 36.0 |
| Example 19 | FB-2 | 0.8 | 2.0 | o | 40 | — | — | — | — | Nonionic | 0.15 | 3.1 | 35.8 |
| Example 20 | FB-2 | 0.5 | 2.5 | o | — | 20 | — | — | — | Nonionic | 0.15 | 1.9 | 35.6 |
| Example 21 | FB-2 | 0.5 | 2.5 | o | — | — | 20 | — | — | Nonionic | 0.15 | 1.8 | 35.7 |
| Example 22 | FB-2 | 0.5 | 2.5 | o | 10 | 10 | — | — | — | Nonionic | 0.15 | 1.8 | 35.8 |
| Example 23 | DY86 | 0.5 | 2.4 | o | 10 | 10 | — | 1 | — | Nonionic | 0.15 | 1.9 | 36.0 |
| Example 24 | DY86 | 0.5 | 2.4 | o | 10 | 10 | — | — | 1 | Nonionic | 0.15 | 1.9 | 35.9 |
| Example 25 | DBL199 | 0.5 | 2.5 | o | 20 | — | — | — | — | Nonionic | 0.15 | 1.6 | 35.8 |
| Example 26 | DY86 | 0.5 | 2.5 | o | 20 | — | — | — | — | Nonionic | 0.15 | 1.6 | 35.9 |

TABLE 5-continued

| | Dye | | | Water-soluble organic compound | | | | | Surfactant | | Viscosity (mPa·s) | Surface tension (mN/m) |
|---|---|---|---|---|---|---|---|---|---|---|---|---|
| | Kind | Content (mass %) | With respect to water-soluble organic compound Content (mass %) | saturation solubility or less | Water-soluble organic solvent GLY | TEG | DEG (mass %) | EtU | Solid TMP | Kind | Content (mass %) | | |
| Example 27 | DBL199 | 0.5 | 2.5 | ○ | 20 | — | — | — | — | Nonionic | 0.1 | 1.6 | 37.1 |
| Example 28 | DBL199 | 0.5 | 2.5 | ○ | 20 | — | — | — | — | Nonionic | 0.18 | 1.7 | 35.1 |
| Comparative Example 7 | FB-2 | 0.1 | 0.5 | ○ | 20 | — | — | — | — | Nonionic | 0.15 | 1.7 | 35.7 |
| Comparative Example 8 | FB-2 | 1.5 | 3.8 | ○ | 40 | — | — | — | — | Nonionic | 0.15 | 2.1 | 36.3 |
| Comparative Example 9 | FB-2 | 0.5 | 5.0 | x | 10 | — | — | — | — | Nonionic | 0.15 | 1.3 | 35.9 |
| Comparative Example 10 | FB-2 | 0.5 | 2.5 | ○ | 20 | — | — | — | — | Nonionic | 0.3 | 1.9 | 33.2 |
| Comparative Example 11 | FB-2 | 0.5 | 2.5 | ○ | 20 | — | — | — | — | Nonionic | 0.15 | 1.7 | 35.8 |

TABLE 6

| | Head | | Evaluation | |
|---|---|---|---|---|
| | Kind | Contact angle (°) | Ink replaceability | Image quality after ink replacement |
| Example 15 | Water-repellent | 103.3 | ○○ | Δ |
| Example 16 | Water-repellent | 103.3 | ○ | ○ |
| Example 17 | Water-repellent | 103.3 | ○ | ○ |
| Example 18 | Water-repellent | 103.3 | Δ | ○ |
| Example 19 | Water-repellent | 103.3 | Δ | ○○ |
| Example 20 | Water-repellent | 103.3 | ○ | ○ |
| Example 21 | Water-repellent | 103.3 | ○ | ○ |
| Example 22 | Water-repellent | 103.3 | ○ | ○ |
| Example 23 | Water-repellent | 103.3 | ○○ | ○ |
| Example 24 | Water-repellent | 103.3 | ○○ | ○ |
| Example 25 | Water-repellent | 103.3 | ○ | ○ |
| Example 26 | Water-repellent | 103.3 | ○○ | ○ |
| Example 27 | Water-repellent | 103.3 | ○ | ○ |
| Example 28 | Water-repellent | 103.3 | ○ | ○ |
| Comparative Example 7 | Water-repellent | 103.3 | ○○ | x |
| Comparative Example 8 | Water-repellent | 103.3 | x | x |
| Comparative Example 9 | Water-repellent | 103.3 | ○ | x |
| Comparative Example 10 | Water-repellent | 103.3 | ○ | x |
| Comparative Example 11 | Hydrophilic | 55 | ○ | x |

As shown in Table 6, Examples 15 to 28 using the filling liquid for distribution of the present invention showed satisfactory results in both the ink replaceability and the image quality after ink replacement.

On the other hand, in Comparative Example 7 using a filling liquid for distribution having a low content of a dye, the image quality after ink replacement was unsatisfactory. In Comparative Example 8 using a filling liquid for distribution having a high content of a dye, both the ink replaceability and the image quality after ink replacement were unsatisfactory. Further, in Comparative Example 9 using a filling liquid for distribution in which a dye was dissolved at a concentration equal to or more than the saturation solubility with respect to a water-soluble organic compound, Comparative Example 10 using a filling liquid for distribution having low surface tension, and Comparative Example 11 using a head in which a hydrophilic region was formed on the periphery of an ink discharge port, the image quality after ink replacement was unsatisfactory.

The filling liquid for distribution according to this embodiment can be used as a filling liquid for distribution for an ink jet head in which a water-repellent region is formed on the periphery of an ink discharge port.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-087271, filed Apr. 18, 2013, and No. 2013-087272, filed Apr. 18, 2013, which are hereby incorporated by reference herein in their entirety.

What is claimed is:

1. A filling liquid for distribution of an ink jet head of a thermal type, the filling liquid for distribution being to fill a nozzle flow path communicating with an ink discharge port during distribution of the ink jet head, the ink discharge port of the ink jet head having an opening area of from 100 to 350 µm², the ink jet head including a hydrophilic region formed on an outer surface on a periphery of the ink discharge port, the filling liquid for distribution comprising:
   an aqueous medium including at least a water-soluble organic compound and water as constituents; and
   a dye dissolved in the aqueous medium, a concentration of the dye in the filling liquid for distribution being 0.2 mass % or more and 1 mass % or less with respect to a total mass of the filling liquid for distribution and the concentration of the dye being equal to or less than saturation solubility with respect to the water-soluble organic compound,
   wherein the filling liquid for distribution has a surface tension of 25 mN/m or more and 34 mN/m or less.

2. A filling liquid for distribution according to claim 1, wherein the water-soluble organic compound comprises a water-soluble organic solvent having a vapor pressure of 3 Pa or less at 20° C.

3. A filling liquid for distribution according to claim 2, wherein the water-soluble organic compound comprises a solution in which a water-soluble organic compound that is solid at 20° C. is dissolved in the water-soluble organic solvent.

4. A filling liquid for distribution according to claim 3, wherein the water-soluble organic compound that is solid at 20° C. is ethylene urea.

5. A filling liquid for distribution according to claim 1, wherein a concentration of the water-soluble organic compound in the filling liquid for distribution is 40 mass % or less with respect to the total mass of the filling liquid for distribution.

6. A filling liquid for distribution according to claim 1, wherein the filling liquid for distribution has a viscosity of 1.3 mPa·s or more and 5.0 mPa·s or less.

7. An ink jet head of a thermal type, comprising:
an ink discharge port having an opening area of from 100 to 350 µm$^2$;
a hydrophilic region formed on a periphery of the ink discharge port; and
a nozzle flow path communicating with the ink discharge port, the nozzle flow path being filled with a filling liquid for distribution as recited in claim 1.

8. An ink jet head according to claim 7, wherein the hydrophilic region has a contact angle of 60° or less with respect to the filling liquid for distribution.

9. An ink jet head according to claim 7, comprising:
a plurality of nozzle flow paths partitioned by nozzle walls;
a plurality of ink discharge ports communicating with the plurality of nozzle flow paths, respectively; and
a plurality of heaters disposed in the plurality of nozzle flow paths, respectively.

10. An ink jet head according to claim 9, wherein the nozzle walls of the ink jet head are formed of an epoxy-based photosensitive resin.

11. An ink jet head according to claim 9, further comprising:
a common liquid chamber communicating with the plurality of nozzle flow paths;
an opening portion communicating with the common liquid chamber;
a main liquid supply chamber communicating with the opening portion;
a liquid supply path communicating with the main liquid supply chamber;
a liquid supply chamber communicating with the liquid supply path;
a supply filter provided in the liquid supply chamber to separate the liquid supply chamber into a first liquid supply chamber and a second liquid supply chamber, the first liquid supply chamber being upstream of the second liquid supply chamber along a flow during liquid supply;
a gas-liquid separation portion provided in a part of the main liquid supply chamber; and
an air chamber communicating with the gas-liquid separation portion,
wherein the plurality of nozzle flow paths, the common liquid chamber, the opening portion, the main liquid supply chamber, the liquid supply path, the liquid supply chamber, the supply filter, the gas-liquid separation portion, and the air chamber are disposed on a plane parallel to a plane including an arrangement direction of the plurality of nozzle flow paths and a discharge direction of the liquid, and the main liquid supply chamber, the liquid supply path, the supply filter, the gas-liquid separation portion, and the air chamber are disposed without being stacked on top of one another.

12. An ink jet head according to claim 7, wherein the ink jet head has a resolution of 600 dpi or more, and the ink jet head comprises a plurality of nozzle flow paths forming a nozzle row having a length of 2 inches or more.

13. A method of distributing an ink jet head of a thermal type, the ink jet head including: an ink discharge port having an opening area of from 100 to 350 µm$^2$; and a hydrophilic region formed on a periphery of the ink discharge port, the method comprising:
distributing the ink jet head in a state in which a filling liquid for distribution as recited in claim 1 fills a nozzle flow path communicating with the ink discharge port.

14. A method according to claim 13, wherein the hydrophilic region has a contact angle of 60° or less with respect to the filling liquid for distribution.

15. A method according to claim 13, comprising:
filling the nozzle flow path with the filling liquid for distribution having a viscosity of 1.3 mPa·s or more and 5.0 mPa·s or less; and
performing a print test with the filling liquid for distribution before the distributing of the ink jet head in the state in which the filling liquid for distribution fills the nozzle flow path.

16. A method according to claim 13, wherein the ink jet head including:
a plurality of nozzle flow paths partitioned by nozzle walls;
a plurality of ink discharge ports communicating with the plurality of nozzle flow paths, respectively; and
a plurality of heaters disposed in the plurality of nozzle flow paths, respectively.

17. A method according to claim 16, wherein the nozzle walls of the ink jet head are formed of an epoxy-based photosensitive resin.

18. A method according to claim 16, wherein the ink jet head further including:
a common liquid chamber communicating with the plurality of nozzle flow paths;
an opening portion communicating with the common liquid chamber;
a main liquid supply chamber communicating with the opening portion;
a liquid supply path communicating with the main liquid supply chamber;
a liquid supply chamber communicating with the liquid supply path;
a supply filter provided in the liquid supply chamber to separate the liquid supply chamber into a first liquid supply chamber and a second liquid supply chamber, the first liquid supply chamber being upstream of the second liquid supply chamber along a flow during liquid supply;
a gas-liquid separation portion provided in a part of the main liquid supply chamber; and
an air chamber communicating with the gas-liquid separation portion,
wherein the plurality of nozzle flow paths, the common liquid chamber, the opening portion, the main liquid supply chamber, the liquid supply path, the liquid supply chamber, the supply filter, the gas-liquid separation portion, and the air chamber are disposed on a plane parallel to a plane including an arrangement direction of the plurality of nozzle flow paths and a discharge direction of the liquid, and the main liquid supply chamber, the liquid supply path, the supply filter, the gas-liquid separation portion, and the air chamber are disposed without being stacked on top of one another.

19. A method according to claim 13, wherein the ink jet head has a resolution of 600 dpi or more, and the ink jet head includes a plurality of nozzle flow paths forming a nozzle row having a length of 2 inches or more.

20. A method according to claim 13, wherein the distributing of the ink jet head is performed in a state in which the ink jet head is mounted on a main body of an ink jet recording device.

21. A filling liquid for distribution according to claim 1, wherein the filling liquid for distribution has a contact angle of 60° or less with respect to the hydrophilic region.

22. A filling liquid for distribution according to claim 1, wherein the concentration of the dye in the filling liquid for distribution is 0.2 mass % or more and 0.8 mass % or less with respect to the total mass of the filling liquid for distribution.

23. A filling liquid for distribution of an ink jet head of a thermal type, the filling liquid for distribution being to fill a nozzle flow path communicating with an ink discharge port during distribution of the ink jet head, the ink discharge port of the ink jet head having an opening area of from 100 to 350 $\mu m^2$, the ink jet head including a water-repellent region formed on an outer surface on a periphery of the ink discharge port, the filling liquid for distribution comprising:

an aqueous medium containing at least a water-soluble organic compound and water as constituents; and a dye dissolved in the aqueous medium, a concentration of the dye in the filling liquid for distribution being 0.2 mass % or more and 1 mass % or less with respect to a total mass of the filling liquid for distribution and the concentration of the dye being equal to or less than saturation solubility with respect to the water-soluble organic compound, wherein the filling liquid for distribution has a surface tension of 35 mN/m or more and 43 mN/m or less.

24. A filling liquid for distribution according to claim 23, wherein the water-soluble organic compound comprises a water-soluble organic solvent having a vapor pressure of 3 Pa or less at 20° C.

25. A filling liquid for distribution according to claim 24, wherein the water-soluble organic compound comprises a solution in which a water-soluble organic compound that is solid at 20° C. is dissolved in the water-soluble organic solvent.

26. A filling liquid for distribution according to claim 25, wherein the water-soluble organic compound that is solid at 20° C. is ethylene urea.

27. A filling liquid for distribution according to claim 23, wherein a concentration of the water-soluble organic compound in the filling liquid for distribution is 40 mass % or less with respect to the total mass of the filling liquid for distribution.

28. A filling liquid for distribution according to claim 23, wherein the filling liquid for distribution has a viscosity of 1.3 mPa·s or more and 5.0 mPa·s or less.

29. An ink jet head of a thermal type, comprising:

an ink discharge port having an opening area of from 100 to 350 $\mu m^2$;

a water-repellent region formed on a periphery of the ink discharge port; and a nozzle flow path communicating with the ink discharge port, the nozzle flow path being filled with a filling liquid for distribution as recited in claim 23.

30. An ink jet head according to claim 29, wherein the water-repellent region has a contact angle of 90° or more with respect to water.

31. An ink jet head according to claim 29, comprising:

a plurality of nozzle flow paths partitioned by nozzle walls;

a plurality of ink discharge ports communicating with the plurality of nozzle flow paths, respectively; and a plurality of heaters disposed in the plurality of nozzle flow paths, respectively.

32. An ink jet head according to claim 31, wherein the nozzle walls of the ink jet head are formed of an epoxy-based photosensitive resin.

33. An ink jet head according to claim 31, further comprising:

a common liquid chamber communicating with the plurality of nozzle flow paths;

an opening portion communicating with the common liquid chamber;

a main liquid supply chamber communicating with the opening portion;

a liquid supply path communicating with the main liquid supply chamber;

a liquid supply chamber communicating with the liquid supply path;

a supply filter provided in the liquid supply chamber to separate the liquid supply chamber into a first liquid supply chamber and a second liquid supply chamber, the first liquid supply chamber being upstream of the second liquid supply chamber along a flow during liquid supply;

a gas-liquid separation portion provided in a part of the main liquid supply chamber; and an air chamber communicating with the gas-liquid separation portion, wherein the plurality of nozzle flow paths, the common liquid chamber, the opening portion, the main liquid supply chamber, the liquid supply path, the liquid supply chamber, the supply filter, the gas-liquid separation portion, and the air chamber are disposed on a plane parallel to a plane including an arrangement direction of the plurality of nozzle flow paths and a discharge direction of the liquid, and the main liquid supply chamber, the liquid supply path, the supply filter, the gas-liquid separation portion, and the air chamber are disposed without being stacked on top of one another.

34. An ink jet head according to claim 29, wherein the ink jet head has a resolution of 600 dpi or more, and the ink jet head comprises a plurality of nozzle flow paths forming a nozzle row having a length of 2 inches or more.

35. A method of distributing an ink jet head of a thermal type, the ink jet head including: an ink discharge port having an opening area of from 100 to 350 $\mu m^2$; and a water-repellent region formed on a periphery of the ink discharge port, the method comprising:

distributing the ink jet head in a state in which a filling liquid for distribution as recited in claim 23 fills a nozzle flow path communicating with the ink discharge port.

36. A method according to claim 35, wherein the water-repellent region has a contact angle of 90° or more with respect to water.

37. A method according to claim 35, comprising:
- filling the nozzle flow path with a filling liquid for distribution having a viscosity of 1.3 mPa·s or more and 5.0 mPa·s or less; and
- performing a print test with the filling liquid for distribution before the distributing of the ink jet head in the state in which the filling liquid for distribution fills the nozzle flow path.

38. A method according to claim 35, wherein the ink jet head including:
- a plurality of nozzle flow paths partitioned by nozzle walls;
- a plurality of ink discharge ports communicating with the plurality of nozzle flow paths, respectively; and
- a plurality of heaters disposed in the plurality of nozzle flow paths, respectively.

39. A method according to claim 38, wherein the nozzle walls of the ink jet head are formed of an epoxy-based photosensitive resin.

40. A method according to claim 38, wherein the ink jet head further including:
- a common liquid chamber communicating with the plurality of nozzle flow paths;
- an opening portion communicating with the common liquid chamber;
- a main liquid supply chamber communicating with the opening portion;
- a liquid supply path communicating with the main liquid supply chamber;
- a liquid supply chamber communicating with the liquid supply path;
- a supply filter provided in the liquid supply chamber to separate the liquid supply chamber into a first liquid supply chamber and a second liquid supply chamber, the first liquid supply chamber being upstream of the second liquid supply chamber along a flow during liquid supply;
- a gas-liquid separation portion provided in a part of the main liquid supply chamber; and
- an air chamber communicating with the gas-liquid separation portion,
  wherein the plurality of nozzle flow paths, the common liquid chamber, the opening portion, the main liquid supply chamber, the liquid supply path, the liquid supply chamber, the supply filter, the gas-liquid separation portion, and the air chamber are disposed on a plane parallel to a plane including an arrangement direction of the plurality of nozzle flow paths and a discharge direction of the liquid, and
  the main liquid supply chamber, the liquid supply path, the supply filter, the gas-liquid separation portion, and the air chamber are disposed without being stacked on top of one another.

41. A method according to claim 35, wherein the ink jet head has a resolution of 600 dpi or more, and the ink jet head includes a plurality of nozzle flow paths forming a nozzle row having a length of 2 inches or more.

42. A method according to claim 35, wherein the distributing of the ink jet head is performed in a state in which the ink jet head is mounted on a main body of an ink jet recording device.

43. A filling liquid for distribution according to claim 23, wherein the concentration of the dye in the filling liquid for distribution is 0.2 mass % or more and 0.8 mass % or less with respect to the total mass of the filling liquid for distribution.

* * * * *